United States Patent
Xie et al.

(10) Patent No.: US 12,372,745 B2
(45) Date of Patent: Jul. 29, 2025

(54) WIDE-ANGLE LENS, IMAGE CAPTURING DEVICE, AND ELECTRONIC DEVICE

(71) Applicant: JIANGXI JINGCHAO OPTICAL CO., LTD., Nanchang (CN)

(72) Inventors: Han Xie, Nanchang (CN); Binbin Liu, Nanchang (CN); Ming Li, Nanchang (CN); Hairong Zou, Nanchang (CN)

(73) Assignee: JIANGXI JINGCHAO OPTICAL CO., LTD., Nanchang (CN)

(*) Notice: Subject to any disclaimer, the term of this patent is extended or adjusted under 35 U.S.C. 154(b) by 615 days.

(21) Appl. No.: 17/629,403

(22) PCT Filed: Mar. 3, 2020

(86) PCT No.: PCT/CN2020/077551
§ 371 (c)(1),
(2) Date: Jan. 23, 2022

(87) PCT Pub. No.: WO2021/174408
PCT Pub. Date: Sep. 10, 2021

(65) Prior Publication Data
US 2022/0326481 A1    Oct. 13, 2022

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC ............................. G02B 9/60; G02B 13/0045
(Continued)

(56) References Cited

U.S. PATENT DOCUMENTS

2013/0301147 A1    11/2013   Yamada
2014/0211328 A1*    7/2014   Hashimoto ........ G02B 13/0045
                                                            359/714

FOREIGN PATENT DOCUMENTS

CN          101710207 A      5/2010
CN          104166220 A     11/2014
(Continued)

OTHER PUBLICATIONS

International Search Report dated Nov. 18, 2020 issued on International Patent Application PCT No. PCT/CN2020/077551, filed Mar. 3, 2020, in the name of Jiangxi Jingchao Optical Co., Ltd.
(Continued)

*Primary Examiner* — Wyatt A Stoffa
*Assistant Examiner* — Grant A Gagnon
(74) *Attorney, Agent, or Firm* — Franklin & Associates International Inc; Matthew F. Lambrinos

(57) ABSTRACT

A wide-angle lens, an image capturing device and an electronic device. The wide-angle lens includes in sequence from an object side to an image side along an optical axis: a first lens with a negative focal power, an image side surface of the first lens is concave at the optical axis; a second lens with a positive focal power, an object side surface of the second lens is convex at the optical axis, and an image side surface of the second lens is convex at the optical axis; a third lens with a focal power; a fourth lens with a positive focal power, an image side surface of the fourth lens is convex at the optical axis; a fifth lens with a negative focal power, an object side surface of the fifth lens is convex at the optical axis, an image side surface of the fifth lens is concave at the optical axis, and at least one of the object side surface and the image side surface of the fifth lens includes at least one inflection point; and an optical stop
(Continued)

disposed between the first lens and the second lens; one of the first lens to the fifth lens is a glass lens.

20 Claims, 8 Drawing Sheets

(58) Field of Classification Search
USPC .......................................................... 359/770
See application file for complete search history.

(56) References Cited

FOREIGN PATENT DOCUMENTS

| CN | 104166220 B | 5/2016 |
|---|---|---|
| CN | 107272165 A | 10/2017 |
| CN | 108254880 A | 7/2018 |
| CN | 108469669 A | 8/2018 |
| CN | 108931845 A | 12/2018 |
| CN | 208488590 U | 2/2019 |
| CN | 107272165 B | 5/2019 |
| CN | 105607223 A | 9/2019 |
| CN | 110727084 A | 1/2020 |
| JP | 2011209352 A | 10/2011 |
| KR | 102004423 B1 | 7/2019 |
| KR | 20190080527 A | 7/2019 |
| TW | I662315 B | 6/2019 |
| TW | 202024709 A | 7/2020 |
| WO | 2016084117 A1 | 6/2016 |

OTHER PUBLICATIONS

The Design of Hybrid Diffraction-refraction 13mega-pixel Mobile Phone Lens, pp. 9~15 published Dec. 15, 2015 by Journal of Changchun University of Science and Technology Natural Science Edition.
Chinese Office action dated Apr. 3, 2025 issued on CN2020101387252.

* cited by examiner

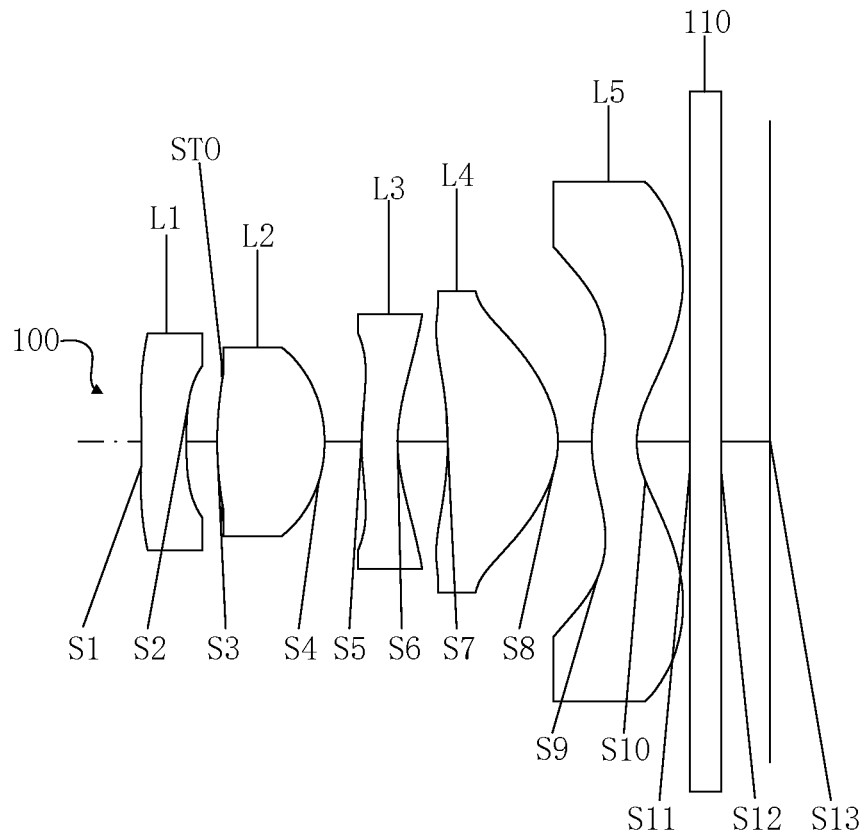
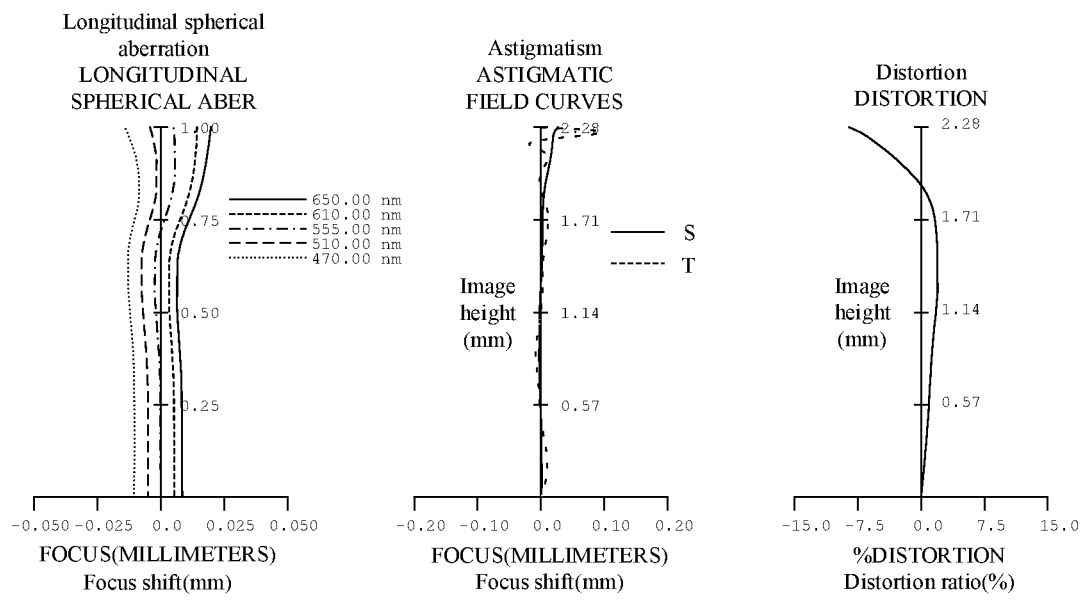
FIG. 2

WIDE-ANGLE LENS, IMAGE CAPTURING DEVICE, AND ELECTRONIC DEVICE

CROSS REFERENCE TO RELATED APPLICATION

This application is a national stage, filed under 35 U.S.C. § 371, of International Patent Application No. PCT/CN2020/077551, entitled "WIDE-ANGLE LENS, IMAGE CAPTURE DEVICE, AND ELECTRONIC DEVICE", filed 3 Mar. 2020, the contents of which are incorporated by reference herein in its entirety.

TECHNICAL FIELD

The present disclosure relates to the field of optical imaging technology, and more particularly, to a wide-angle lens, an image capturing device and an electronic device.

BACKGROUND

In recent years, with the development of science and technology, portable electronic products with camera functions have become more popular. Among them, a wide-angle lens has a larger shooting field of view, and can shoot large scenes or panoramic photos within a limited distance range, which can better meet the needs of users.

However, in order to ensure the imaging quality while having a larger range of viewing angle, the conventional wide-angle lens often has a relative large head, which is difficult to meet the development trend of lightness, thinness and miniaturization of the electronic products. Meanwhile, with the development of CMOS chip technology, the pixel size of the chip is getting smaller and smaller, and the requirements for the imaging quality of matching lenses are getting higher and higher.

SUMMARY

According to various embodiments of the present disclosure, a wide-angle lens is provided.

A wide-angle lens, which includes in sequence from an object side to an image side along an optical axis:
  a first lens with a negative focal power, an image side surface of the first lens is concave at the optical axis;
  a second lens with a positive focal power, an object side surface of the second lens is convex at the optical axis, and an image side surface of the second lens is convex at the optical axis;
  a third lens with a focal power;
  a fourth lens with a positive focal power, an image side surface of the fourth lens is convex at the optical axis;
  a fifth lens with a negative focal power, an object side surface of the fifth lens is convex at the optical axis, an image side surface of the fifth lens is concave at the optical axis, and at least one of the object side surface and the image side surface of the fifth lens includes at least one inflection point; and,
  an optical stop disposed between the first lens and the second lens; one of the first lens to the fifth lens is a glass lens, and
  the wide-angle lens satisfies the following relationship expression:

$sd1/ImgH<0.36$;

wherein, sd1 represents a maximum effective half-aperture of an object side surface of the first lens, and ImgH is half of a diagonal length of an effective pixel area on an imaging surface of the wide-angle lens.

An image capturing device, which includes a photosensitive element and the wide-angle lens as described in the above embodiment. The photosensitive element is disposed on an image side of the wide-angle lens.

An electronic device, which includes a housing and the image capturing device described in the above embodiment, and the image capturing device is installed on the housing.

The details of one or more embodiments of the present disclosure are set forth in the accompanying drawings and description below. Other features, purposes and advantages of the present disclosure will become apparent from the description, the accompanying drawings, and the claims.

BRIEF DESCRIPTION OF THE DRAWINGS

To better describe and illustrate embodiments or examples of the disclosure disclosed herein, reference may be made to one or more accompanying drawings. The additional details or examples used to describe the accompanying drawings should not be construed as limiting the scope of any of the disclosed disclosure, the presently described embodiments or examples, and the presently understood preferred mode of the disclosure.

FIG. 1 shows a schematic structural diagram of a wide-angle lens according to Embodiment 1 of the present disclosure.

FIG. 2 shows a graph of longitudinal spherical aberration, a graph of astigmatism, and a graph of distortion of the wide-angle lens according to Embodiment 1 respectively.

DETAILED DESCRIPTION OF THE EMBODIMENTS

Figure 3:
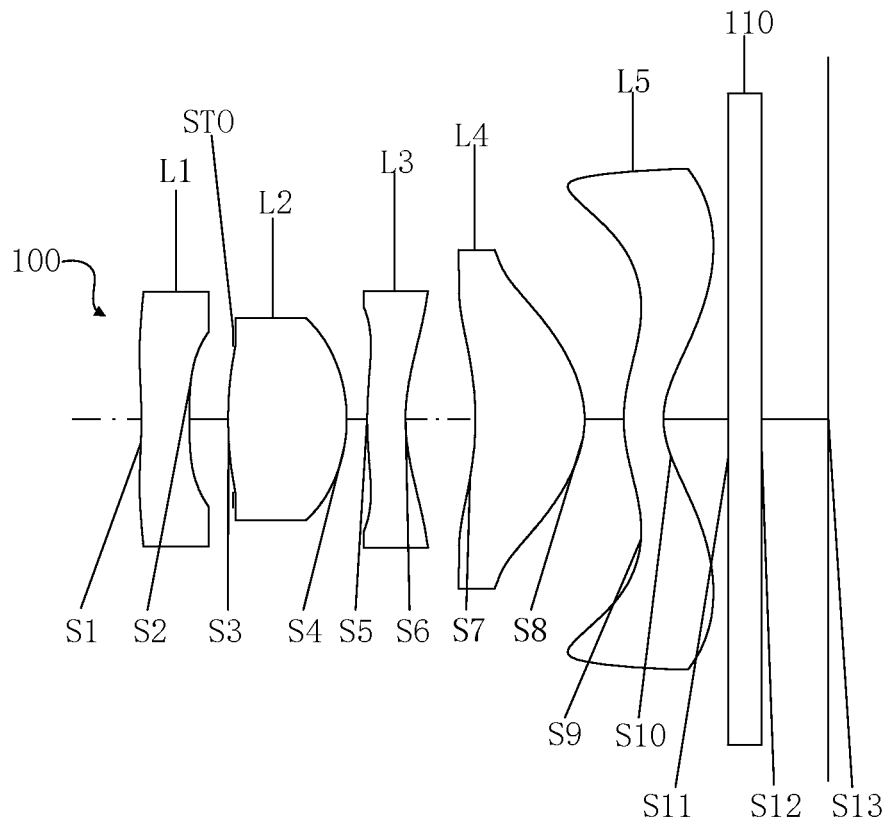
FIG. 3 shows a schematic structural diagram of a wide-angle lens according to Embodiment 2 of the present disclosure.

To make the purposes, technical solutions and advantages of the present disclosure to be more apparent and understandable, reference will be made to the accompanying drawings and embodiments to describe the present disclosure in detail below. It should be understood that the specific embodiments described herein are only used to explain the present disclosure and not intended to limit the present disclosure.

It should be understood that when an element is defined as "disposed" on another element, it is either directly on an element or indirectly on an element with a mediating element. When an element is considered to be "connected" to another element, it may be directly connected to another element or there may be an intermediate element between them at the same time. The terms "vertical", "horizontal", "left", "right", and the like used herein are for illustrative purposes only and are not intended to be the only implementation.

It should be noted that in this specification, expressions such as first, second, third, and the like, are merely used to distinguish one feature from another feature, and do not indicate any limitations on the features. Therefore, without departing from the teachings of the present disclosure, the first lens discussed below may also be referred to as a second lens or a third lens.

To facilitate the description, the shapes of the spherical surfaces or aspherical surfaces shown in the drawings are shown by way of example. That is, the shapes of the spherical surfaces or the aspherical surfaces are not limited to the shapes of the spherical surfaces or the aspherical surfaces shown in the drawings. The accompanying drawings are only examples and are not drawn strictly to scale.

All technical and scientific terms used herein have the same meaning as commonly understood by one of ordinary skill in the art to which the present disclosure applies, unless otherwise defined. The terms used in the specification of present disclosure herein are for the purpose of describing specific embodiments only and are not intended to limit the present disclosure. The term "and/or" used herein includes any and all combinations of one or more of the associated listed items.

In order to ensure a wide viewing angle and imaging quality, the conventional wide-angle lens usually has a first lens with a relatively large aperture, which is difficult to meet the application requirements of thin and light electronic products. In addition, the first lens of this type of wide-angle lens has an edge shape curved in a relatively large degree, so the mass production molding process of the lens is not high.

The defects of the above solutions are results obtained by the inventors through practice and careful research. Therefore, the discovery process of the above problems and the solutions proposed in the embodiments of the present disclosure for the above problems below shall be regarded as the inventors' contributions to the present disclosure during the process of the present disclosure.

Please refer to FIG. 1, FIG. 3, FIG. 5, FIG. 7, FIG. 9, FIG. 11 and FIG. 13 in combination. A wide-angle lens of an embodiment of the present disclosure includes five lenses with focal powers, namely, a first lens, a second lens, a third lens, a fourth lens, and a fifth lens. These five lenses are arranged in sequence from an object side to an image side along an optical axis. An optical stop is arranged between the first lens and the second lens to effectively limit a size of a light beam and further improve the imaging quality.

The first lens has a negative focal power, and its image side surface is concave at the optical axis, so that light rays incident at a large angle can also be focused to the imaging surface of the wide-angle lens, ensuring the viewing angle and imaging quality of the lens.

The second lens has a positive focal power, and its object side surface is convex at the optical axis, and its image side surface is convex at the optical axis, which is beneficial to focus the light rays passing through the optical stop, correct an aberration and a field curvature of the lens, and improve the imaging quality of the lens.

The third lens has a focal power, which is beneficial to cooperate with the second lens to correct a chromatic aberration of the lens.

The fourth lens has a positive focal power, and an image side surface of the fourth lens is convex at the optical axis, which is beneficial to cooperate with the second lens and the third lens to further correct the chromatic aberration of the lens and improve the imaging quality.

The fifth lens has a negative focal power, and its object side surface is convex at the optical axis, its image side surface is concave at the optical axis, and at least one of the object side surface and the image side surface of the fifth lens includes at least one inflection point. By disposing the inflection point, an angle at which a light ray of an off-axis field of view is incident on a photosensitive element can be effectively suppressed, and at the same time, an aberration of the off-axis field of view can be further corrected, and the imaging quality can be improved.

One of the first lens to the fifth lens is a glass lens. Since glass with a higher refractive index can optimize an optical transfer function of the lens, the use of the glass lens can improve an imaging resolution of the wide-angle lenses. Meanwhile, glass lenses are more stable than plastic lenses in a problem of temperature drift, so they are beneficial to reduce an environmental sensitivity of the lens. It should be noted that due to a high cost of manufacturing the glass lens, only one lens is selected from the first lens to the fifth lens as a glass lens, which can strike a balance between improving the imaging quality of the lens and controlling the cost of the lens.

Specifically, the wide-angle lens satisfies the following relationship expression: sd1/ImgH<0.36, where, sd1 represents a maximum effective half-aperture of the object side surface of the first lens, and ImgH is half of a diagonal length of an effective pixel area on the imaging surface of the wide-angle lens. sd1/ImgH may be 0.2, 0.22, 0.24, 0.26, 0.28, 0.29, 0.3, 0.31, 0.32, 0.33, 0.34, or 0.35. Under the condition of satisfying the above relationship expression, the lens can have a larger field of view while fully compressing an outer diameter of the first lens, thereby optimizing an optical effective aperture of the first lens, and reducing a head size of the lens, so as to better meet the application needs of light and thin electronic devices such as mobile phones, tablets, and the like. When sd1/ImgH is greater than or equal to 0.36, the effective aperture of the first lens is easy to be larger, resulting in a larger outer diameter of the first lens, which is not conducive to the realization of a small head of the lens.

In addition, the optical stop may include an aperture stop and a field stop. Optionally, the optical stop is an aperture stop. The aperture stop can be located on a surface (for example, the object side surface and the image side surface) of the lens, and form a functional relationship with the lens. For example, by coating a light-blocking coating layer on a surface of the lens to form an aperture stop on the surface; or, by fixedly clamping a surface of the lens with a clamping piece, and the clamping piece structure located on the surface can limit a width of an imaging beam of an object point on the axis, thereby forming an aperture stop on the surface.

When the above described wide-angle lens is used for imaging, light rays emitted or reflected by the imaged object enters the wide-angle lens from the object side, and passes through the first lens, the second lens, the third lens, the fourth lens, and the fifth lens in sequence, and finally converges onto the imaging surface.

In the above described wide-angle lens, while ensuring a relative large field of view, the aperture, curvature and shape of the first lens is optimized to fully compress the aperture of the first lens, thereby reducing the head size of the wide-angle lens and making it better meet the application requirements of light and thin electronic equipment. Meanwhile, by reasonably distributing the optical powers, surface shapes of the lenses and distances between the lenses, the aberration of the wide-angle lens can be reduced, and the imaging quality of the wide-angle lens can be ensured. In addition, by disposing one of the first lens to the fifth lens as a glass lens, it is beneficial to further improve the resolution of the wide-angle lens, and the temperature drift of the glass lens under different temperature changing environments is small, which is beneficial to reduce the environmental sensitivity of the wide-angle lens.

In an exemplary embodiment, the wide-angle lens satisfies the following relationship expression: n>1.7; where n represents a refractive index of the glass lens. n may be 1.705, 1.71, 1.72, 1.73, 1.75, 1.77, 1.79, 1.81, 1.82, 1.83, or 1.85. By controlling the refractive index of the glass lens to satisfy the above relationship, the optical transfer function of the wide-angle lens can be optimized by using the glass lens with a higher refractive index, thereby further improving the imaging resolution of the lens.

In an exemplary embodiment, the wide-angle lens satisfies the following relationship expression: −160<f1/sd1<−3; where f1 represents the effective focal length of the first lens. f1/sd1 may be −159.1, −16, −15, −10, −9, −7, −5, −4.8, −4.6, −4.4, −4.2, −4, −3.8, −3.6, or −3.2. By controlling the effective focal length of the first lens and the maximum effective semi-aperture of the object side surface of the first lens to satisfy the above relationship, the first lens can provide negative focal power for the lens, which is beneficial to let light rays incident at large angles enter the lens and increases the field of view of the lens. Meanwhile, by rationally configuring the effective aperture of the object side surface of the first lens to fully compress the outer diameter of the first lens, it is beneficial to miniaturize the front end of the lens module and make the lens have a structural characteristic of a small head. When f1/sd1 is less than or equal to −160, the first lens cannot provide sufficient negative focal power for the lens, which makes it difficult to ensure the wide-angle shooting effect. When f1/sd1 is greater than or equal to −3, the effective aperture of the first lens is easy to be relatively large, which is not conducive to realizing the small head of the lens.

In an exemplary embodiment, the wide-angle lens satisfies the following relationship expression: 80°≤FOV<120°; where FOV represents a diagonal field of view of the wide-angle lens. FOV may be 80°, 85°, 90°, 95°, 100°, 103°, 106°, 109°, 112°, 113°, 114°, 116°, or 118°. Optionally, the wide-angle lens satisfies 100°≤FOV≤110°. By controlling the diagonal field of view of the wide-angle lens to satisfy the above relationship, it is beneficial to expand the shooting range of the lens and improve the user's shooting experience.

In an exemplary embodiment, the wide-angle lens satisfies the following relationship: |CT4/R42|>0.37; where CT4 represents a thickness of the fourth lens on the optical axis, and R42 represents a radius of curvature of the image side surface of the fourth lens at the optical axis. |CT4/R42| may be 0.371, 0.372, 0.4, 0.6, 0.7, 0.71, 0.72, 0.73, 0.75, 0.9, 0.95, 1.0, 1.1, or 1.2. Under the condition of satisfying the above relationship, the thickness of the fourth lens can be increased within a reasonable range to make the surface shape of the fourth lens smoother, so as to facilitate the lens processing and also help to reduce the lens ghost.

In an exemplary embodiment, the wide-angle lens satisfies the following relationship expression: CT2>0.55 mm; where CT2 represents the thickness of the second lens on the optical axis. CT2 may be 0.555 mm, 0.65 mm, 0.7 mm, 0.71 mm, 0.73 mm, 0.75 mm, 0.77 mm, 0.79 mm, 0.81 mm, 0.85 mm, 0.89 mm, 0.93 mm, or 0.95 mm Under the condition of satisfying the above relationship, it is beneficial to improve the positive focal power of the second lens, and by adjusting the radius of curvature and shape of the object side surface of the second lens, the light rays can be better incident into the wide-angle lens; meanwhile, it is also beneficial to shorten the overall length of the lens while ensuring good imaging quality. When CT2 is less than or equal to 0.55 mm, it is unable to provide sufficient positive focal power for the wide-angle lens, which is not conducive to focusing the light rays incident at large angles, and is relatively difficult to ensure the imaging quality.

In an exemplary embodiment, the wide-angle lens satisfies the following relationship expression: 0.69<f12/f<1.2; where f12 represents a combined focal length of the first lens and the second lens, and f represents the effective focal length of the wide-angle lens. f12/f may be 0.691, 0.693, 0.8, 0.83, 0.86, 0.89, 0.92, 0.95, 0.98, 1.1, 1.15, or 1.18. Under the condition of satisfying the above relationship, it is beneficial to correct the aberration and field curvature of the wide-angle lens, thereby enabling the lens to have a better shooting performance. When f12/f is less than or equal to 0.69, the effective focal length of the lens is relatively long, which is not conducive to the miniaturization of the lens. When f12/f is greater than or equal to 1.2, it is not conducive to provide sufficient positive focal power for the lens to enable the light rays incident into the lens to be focused and imaged, and thus the imaging quality cannot be guaranteed.

In an exemplary embodiment, the wide-angle lens satisfies the following relationship expression: TTL/ImgH<1.85; where TTL represents a distance from the object side surface of the first lens to the imaging surface of the wide-angle lens on the optical axis. TTL/ImgH may be 1.55, 1.56, 1.57, 1.6, 1.63, 1.66, 1.7, 1.75, 1.77, 1.79, 1.82, 1.84, or 1.845. By controlling the total length of the lens and the half-image height on the imaging surface of the wide-angle lens to satisfy the above relationship, it is beneficial to compress the total length of the wide-angle lens while ensuring the imaging quality, and realize the miniaturization of the lens.

In an exemplary embodiment, the wide-angle lens satisfies the following relationship expression: 0.9<ET5/CT5<2.3; where CT5 represents the thickness of the fifth lens on the optical axis, and ET5 represents the thickness of the fifth lens at the maximum effective aperture of the fifth lens. ET5/CT5 may be 0.93, 1.0, 1.2, 1.4, 1.5, 1.7, 1.75, 1.8, 2.0, 2.3, 2.6, 2.1, or 2.2. Further, the wide-angle lens satisfies 1.8<ET5/CT5<2.3. Under the condition of satisfying the above relationship, the fifth lens can provide negative focal power for the lens, so that the thickness of the fifth lens at the effective aperture of the fifth lens can be increased reasonably, so as to better correct the aberrations of the peripheral field of view, improve the imaging quality of the peripheral field of view, and can further reduce the ghost caused by the reflection of the edge of the lens. However, it should be noted that the thickness of the fifth lens at the effective aperture of the fifth lens cannot be too thick or too thin, that is, the above ratio cannot exceed an upper limit or lower than a lower limit, otherwise the overall thick and thin difference of the fifth lens will be too large, which is not conducive to the lens molding.

In an exemplary embodiment, the wide-angle lens satisfies the following relationship expression: −11.1<f5/R52<−2; where f5 represents the effective focal length of the fifth lens, and R52 represents the radius of curvature of the image side surface of the fifth lens at the optical axis. f5/R52 may be −11.05, −10, −9, −7, −6.5, −6, −5.5, −5, −4.5, −4, −3.5, −3, −2.5, or −2.1. Under the conditions of satisfying the above relationship, the fifth lens can provide negative focal power for the lens, and by properly configuring the surface shape of the convex surface of the image side surface of the fifth lens, it is conducive to further correcting the field curvature, and at the same time, the optical back focal length of the wide-angle lens can also be controlled within a reasonable range, so that the lens has telecentric characteristics. When f5/R52 is greater than or equal to −2, the surface shape of the image side surface of the fifth lens will fluctuate too much, which is not conducive to lens processing. When f5/R52 is less than or equal to −11.1, the fifth lens cannot provide enough negative optical power for the lens, which is not conducive to correcting the field curvature of the lens, and it is also difficult to ensure the back focal length of the lens.

In an exemplary embodiment, lenses other than the glass lens are all made of plastic. The plastic lens can reduce the weight of the wide-angle lens and reduce the production cost.

In an exemplary embodiment, the wide-angle lens further includes an infrared filter. The infrared filter is disposed on the image side of the fifth lens to filter incident light rays, specifically to isolate infrared light and prevent infrared light from being absorbed by the photosensitive elements, thereby preventing infrared light from affecting the color and clarity of normal images, and improving the imaging quality of the wide-angle lens.

The wide-angle lens of the above described embodiments of the present disclosure may use a plurality of lenses, for example, the above described five lenses. By reasonably distributing the focal lengths, optical powers, surface shapes, thicknesses of the lenses, and on-axis distances between the lenses, it is possible to ensure that the above wide-angle lens has a relatively large field of view, while its head is relatively small and light, and has relatively high imaging quality, and also has a relatively large aperture (FNO can be 2.0), which can better meet the application needs of lightweight electronic devices such as mobile phones, tablets, and the like. However, those skilled in the art should understand that without departing from the technical solution claimed in the present disclosure, the number of lenses constituting the wide-angle lens can be changed to obtain the various results and advantages described in this specification.

Specific embodiments of the wide-angle lens applicable to the above described embodiments will be further described below with reference to the accompanying drawings. In the following embodiments, if a surface of the lens is convex and the position where is convex is not defined, then it means that this surface of the lens is convex at least in the paraxial area. If a surface of the lens is concave and the position where is concave is not defined, then it means that this surface of the lens is concave at least in the paraxial area. The paraxial area here refers to an area near the optical axis. A surface of each of the lenses closest to the object is called an object side surface, and a surface of each of the lenses closest to the imaging surface is called an image side surface.

Embodiment 1

A wide-angle lens 100 of Embodiment 1 of the present disclosure will be described below with reference to FIGS. 1 to 2.

FIG. 1 shows a schematic structural diagram of the wide-angle lens 100 according to Embodiment 1. As shown in FIG. 1, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is concave at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is convex at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is concave at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is concave at its circumference, and the image side S8 is convex at the optical axis and is convex at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin and flat while achieving good optical imaging effects, thereby enabling the optical lens 100 to have a characteristic of miniaturization.

The first lens L1 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion. Specifically, the filter 110 is made of glass.

The optical filter 110 may be a part of the wide-angle lens 100 and be assembled together with the lenses, or may also be installed together when the wide-angle lens 100 is assembled with the photosensitive element.

Table 1 shows the surface type, radius of curvature, thickness, material, refractive index, Abbe number (that is, dispersion coefficient) and effective focal length of the lenses of the wide-angle lens 100 of Embodiment 1, where the units of the radius of curvature, thickness, and the effective focal length of the lenses are all millimeters (mm). A surface of a lens closest to the object is called an object side surface, and a surface of a lens closest to the imaging surface is called an image side surface. In addition, taking lens L1 as an example, the first value in the "thickness" parameter column of lens L1 is a thickness of the lens on the optical axis, and the second value therein is a distance on the optical axis from the image side surface of the lens to an object side surface of a rear lens in a direction towards the image side. The value of the optical stop ST0 in the "thickness" parameter column is a distance on the optical axis from the optical stop ST0 to a vertex of the object side surface of the rear lens (the vertex refers to an intersection of the lens and the optical axis), we default that the direction from the object side surface of the first lens L1 to the image side surface of the last lens is the positive direction of the optical axis, when the value is negative, it means that the optical stop ST0 is disposed on the right side of the vertex of the object side surface of the lens, and when the thickness of the optical stop ST0 is positive, the optical stop is on the left side of the vertex of the object side surface of the lens.

TABLE 1

Embodiment 1
f = 1.863 mm, FNO = 2.2, FOV = 106.4°, TTL = 4.2 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | 400.00 | | | | |
| S1 | First lens | Aspherical | −5.758 | 0.300 | Glass | 1.811 | 52.520 | −3.166 |
| S2 | | Aspherical | 4.773 | 0.235 | | | | |
| STO | Optical stop | Spherical | Infinite | −0.029 | | | | |
| S3 | Second lens | Aspherical | 3.313 | 0.718 | Plastic | 1.544 | 56.114 | 1.547 |
| S4 | | Aspherical | −1.047 | 0.247 | | | | |
| S5 | Third lens | Aspherical | 2.069 | 0.240 | Plastic | 1.640 | 23.530 | −5.041 |
| S6 | | Aspherical | 1.206 | 0.335 | | | | |
| S7 | Fourth lens | Aspherical | −2.429 | 0.736 | Plastic | 1.544 | 56.114 | 1.706 |
| S8 | | Aspherical | −0.745 | 0.226 | | | | |
| S9 | Fifth lens | Aspherical | 1.192 | 0.300 | Plastic | 1.636 | 23.785 | −2.284 |
| S10 | | Aspherical | 0.592 | 0.355 | | | | |
| S11 | Infrared filter | Spherical | Infinite | 0.210 | Glass | 1.517 | 64.167 | |
| S12 | | Spherical | Infinite | 0.327 | | | | |
| S13 | Imaging surface | Spherical | Infinite | 0.000 | | | | |

A surface shape of aspherical surface of each lens is defined by the following equation:

$$x = \frac{ch^2}{1+\sqrt{1-(k+1)c^2h^2}} + \Sigma Aih^i \quad (1)$$

Where, x is a distance vector height of the aspherical surface from the apex of the aspherical surface when the aspherical surface is at a position of a height of h along the optical axis direction; c is a paraxial curvature of the aspherical surface, c=1/R (that is, the paraxial curvature c is a reciprocal of the radius of curvature R shown in Table 1); k is a conic coefficient; and Ai is an i-th order coefficient of the aspherical surface. Table 2 below shows the high-order term coefficients A4, A6, A8, A10, A12, A14, A16, A18, and A20 that can be used for the lens aspherical surfaces S1-S10 in Embodiment 1.

TABLE 2

Embodiment 1
Aspheric coefficient

| Surface number | S1 | S2 | S3 | S4 | S5 |
|---|---|---|---|---|---|
| K   | 1.7870E+01  | 6.2164E+01  | 1.4856E+01  | −2.0240E+00 | −5.3760E+01 |
| A4  | 5.7846E−01  | 9.1644E−01  | 2.4198E−01  | −4.2791E−01 | −2.9340E−02 |
| A6  | −1.1477E+00 | −7.7890E−01 | −1.9505E+00 | 4.2692E−01  | −1.7515E+00 |
| A8  | 3.6296E+00  | −8.3085E+00 | 1.6006E+01  | 2.2733E+00  | 6.8262E+00  |
| A10 | −1.4087E+01 | 1.7799E+02  | −1.0243E+02 | −4.9987E+01 | −7.6453E+00 |
| A12 | 4.2558E+01  | −1.7318E+03 | 2.2025E+02  | 3.4023E+02  | −5.7247E+01 |
| A14 | −8.6486E+01 | 9.8614E+03  | 5.2888E+02  | −1.3032E+03 | 2.8948E+02  |
| A16 | 1.0911E+02  | −3.3051E+04 | −2.3327E+03 | 2.9043E+03  | −6.0667E+02 |
| A18 | −7.6749E+01 | 5.9823E+04  | −1.9071E+03 | −3.4959E+03 | 6.3396E+02  |
| A20 | 2.3019E+01  | −4.4734E+04 | 1.0459E+04  | 1.7468E+03  | −2.6995E+02 |

| Surface number | S6 | S7 | S8 | S9 | S10 |
|---|---|---|---|---|---|
| K   | −7.4830E+00 | −1.5513E+01 | −1.3904E+00 | −4.6690E+00 | −1.6062E+00 |
| A4  | −1.7207E−01 | 3.2460E−02  | 2.8161E−01  | −1.8839E−01 | −8.9673E−01 |
| A6  | 4.8356E−01  | −4.5995E−01 | −1.3744E+00 | −7.9976E−01 | 1.1768E+00  |
| A8  | −2.0573E+00 | 2.2251E+00  | 4.2440E+00  | 1.8925E+00  | −1.0675E+00 |
| A10 | 8.8904E+00  | −4.7901E+00 | −1.0456E+01 | −1.7685E+00 | 6.7768E−01  |
| A12 | −2.8453E+01 | 6.7066E+00  | 1.9547E+01  | 2.5056E−01  | −3.0976E−01 |
| A14 | 5.7748E+01  | −5.0350E+00 | −2.5272E+01 | 9.0860E−01  | 1.0285E−01  |
| A16 | −7.0571E+01 | −9.5663E−02 | 2.0874E+01  | −8.0578E−01 | −2.3721E−02 |
| A18 | 4.7830E+01  | 2.7900E+00  | −9.6506E+00 | 2.8372E−01  | 3.3450E−03  |
| A20 | −1.3864E+01 | −1.2973E+00 | 1.8643E+00  | −3.7717E−02 | −2.1230E−04 |

A half ImgH of the diagonal length of the effective pixel area on the imaging surface S13 of the wide-angle lens 100 of this embodiment is 2.28 mm. According to the data in Table 1 and Table 2, it can be seen that the wide-angle lens 100 in Embodiment 1 satisfies:

sd1/ImgH=0.339, where, sd1 represents a maximum effective half-aperture of the object side surface S1 of the first lens L1, and ImgH is half of a diagonal length of an effective pixel area on the imaging surface S13 of the wide-angle lens 100.

n=1.811, where n represents a refractive index of the glass lens. For example, in this embodiment, since the first lens L1 is made of glass, a refractive index of the glass lens is the refractive index of the first lens L1.

F1/sd1=−4.09, where f1 represents the effective focal length of the first lens L1.

FOV=106.4°, where FOV represents a diagonal field of view of the wide-angle lens 100.

|CT4/R42|=0.988, where CT4 represents a thickness of the fourth lens L4 on the optical axis, and R42 represents a radius of curvature of the image side surface S8 of the fourth lens L4 at the optical axis.

CT2=0.718 mm, where CT2 represents the thickness of the second lens L2 on the optical axis.

f12/f=1.157, where f12 represents a combined focal length of the first lens L1 and the second lens L2, and f represents the effective focal length of the wide-angle lens 100.

TTL/ImgH=1.842, where TTL represents a distance from the object side surface S1 of the first lens L1 to the imaging surface S13 of the wide-angle lens 100 on the optical axis.

ET5/CT5=2.03, where CT5 represents the thickness of the fifth lens L5 on the optical axis, and ET5 represents the thickness of the fifth lens L5 at the maximum effective aperture of the fifth lens.

f5/R52=−3.858, where f5 represents the effective focal length of the fifth lens L5, and R52 represents the radius of curvature of the image side surface S10 of the fifth lens L5 at the optical axis.

FIG. 2 shows a graph of longitudinal spherical aberration, a graph of astigmatism, and a graph of distortion of the wide-angle lens 100 according to Embodiment 1 respectively, where a reference wavelength of the wide-angle lens 100 is 555 nm. The graph of longitudinal spherical aberration shows the deviation of the focus point of light rays with wavelengths of 470 nm, 510 nm, 555 nm, 610 nm and 650 nm after passing through the wide-angle lens 100; the graph of astigmatism shows the curvature of meridian image surface and the curvature of sagittal image surface of light rays with a wavelength of 555 nm after passing through the wide-angle lens 100; the graph of distortion shows the distortion ratio of light rays with a wavelength of 555 nm after passing through the wide-angle lens 100 at different image heights. According to FIG. 2, it can be seen that the wide-angle lens 100 provided in Embodiment 1 can achieve good imaging quality.

Embodiment 2

A wide-angle lens 100 of Embodiment 2 of the present disclosure will be described below with reference to FIGS. 3 to 4. In this embodiment, for brevity, some descriptions similar to those in Embodiment 1 will be omitted. FIG. 3 shows a schematic structural diagram of the wide-angle lens 100 according to Embodiment 2 of the present disclosure.

As shown in FIG. 3, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is concave at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is convex at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is concave at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is concave at its circumference, and the image side S8 is convex at the optical axis and is convex at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin and flat while achieving good optical imaging effects, thereby enabling the optical lens 100 to have a characteristic of miniaturization.

The third lens L3 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion.

Table 3 shows the surface type, radius of curvature, thickness, material, refractive index, Abbe number (that is, dispersion coefficient) and effective focal length of the lenses of the wide-angle lens 100 of Embodiment 2, where the units of the radius of curvature, thickness, and the effective focal length of the lenses are all millimeters (mm). Table 4 shows the high-order term coefficients that can be used for the lens aspheric surface S1-S10 in Embodiment 2, where the surface type of the aspherical surface can be defined by the equation (1) provided in Embodiment 1. Table 5 shows values of the relevant parameters of the wide-angle lens 100 provided in Embodiment 2.

TABLE 3

Embodiment 2
f = 2.034 mm, FNO = 2.288, FOV = 105.2°, TTL = 4.3 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | 400.00 | | | | |
| S1 | First lens | Aspherical | −3.716 | 0.300 | Plastic | 1.534 | 55.770 | −4.090 |
| S2 | | Aspherical | 5.516 | 0.274 | | | | |
| STO | Optical stop | Spherical | Infinite | −0.031 | | | | |
| S3 | Second lens | Aspherical | 2.936 | 0.742 | Plastic | 1.544 | 56.114 | 1.600 |
| S4 | | Aspherical | −1.132 | 0.128 | | | | |
| S5 | Third lens | Aspherical | 2.475 | 0.240 | Glass | 1.727 | 23.510 | −4.238 |
| S6 | | Aspherical | 1.321 | 0.438 | | | | |
| S7 | Fourth lens | Aspherical | −2.131 | 0.683 | Plastic | 1.544 | 56.114 | 1.799 |
| S8 | | Aspherical | −0.748 | 0.245 | | | | |
| S9 | Fifth lens | Aspherical | 1.106 | 0.249 | Plastic | 1.636 | 23.785 | −2.412 |

TABLE 3-continued

Embodiment 2
f = 2.034 mm, FNO = 2.288, FOV = 105.2°, TTL = 4.3 mm

| Surface number | Surface name | Surface type | Radius of curvature | Thickness | Material | Refractive index | Abbe number | Focal length |
|---|---|---|---|---|---|---|---|---|
| S10 | | Aspherical | 0.588 | 0.403 | | | | |
| S11 | Infrared filter | Spherical | Infinite | 0.210 | Glass | 1.517 | 64.167 | |
| S12 | | Spherical | Infinite | 0.420 | | | | |
| S13 | Imaging surface | Spherical | Infinite | 0.000 | | | | |

TABLE 4

Embodiment 2
Aspheric coefficient

| Surface number | S1 | S2 | S3 | S4 | S5 |
|---|---|---|---|---|---|
| K | 1.1267E+01 | 5.2070E+01 | 1.2364E+01 | −2.7267E+00 | −5.2718E+01 |
| A4 | 5.7566E−01 | 9.4591E−01 | 1.7339E−01 | −3.8583E−01 | −1.5027E−01 |
| A6 | −1.0234E+00 | −1.0033E+00 | −1.4960E+00 | 1.0441E+00 | −4.2986E−01 |
| A8 | 2.1987E+00 | −6.1619E+00 | 1.9022E+01 | −6.8863E+00 | 2.5258E+00 |
| A10 | −4.2342E+00 | 1.4033E+02 | −2.5319E+02 | 3.2727E+01 | −1.6794E+01 |
| A12 | 3.9438E+00 | −1.2006E+03 | 2.2119E+03 | −1.3472E+02 | 6.5889E+01 |
| A14 | 2.8497E+00 | 5.6856E+03 | −1.2663E+04 | 3.9588E+02 | −1.6598E+02 |
| A16 | −1.1459E+01 | −1.5507E+04 | 4.5042E+04 | −7.3090E+02 | 2.6763E+02 |
| A18 | 1.114013+01 | 2.2737E+04 | −8.9704E+04 | 7.4392E+02 | −2.4935E+02 |
| A20 | −3.8003E+00 | −1.3851E+04 | 7.5996E+04 | −3.1968E+02 | 1.0172E+02 |

| Surface number | S6 | S7 | S8 | S9 | S10 |
|---|---|---|---|---|---|
| K | −7.1671E+00 | −1.1728E+01 | −1.4332E+00 | −3.7645E+00 | −1.5923E+00 |
| A4 | −1.4643E−01 | −3.9625E−03 | 3.1003E−01 | −1.8561E−01 | −9.0565E−01 |
| A6 | 2.4504E−01 | −1.8291E−01 | −1.4448E+00 | −1.0105E+00 | 1.1998E+00 |
| A8 | 3.7233E−02 | 7.0218E−01 | 4.0767E+00 | 3.0818E+00 | −1.1013E+00 |
| A10 | −4.2494E+00 | −5.6064E−02 | −8.4157E+00 | −4.7208E+00 | 6.8970E−01 |
| A12 | 1.7291E+01 | −2.3756E+00 | 1.2785E+01 | 4.4249E+00 | −2.9080E−01 |
| A14 | −3.5859E+01 | 5.1602E+00 | −1.3564E+01 | −2.6215E+00 | 8.0281E−02 |
| A16 | 4.3595E+01 | −5.8016E+00 | 9.5834E+00 | 9.5459E−01 | −1.3772E−02 |
| A18 | −2.9701E+01 | 3.5473E+00 | −3.9863E+00 | −1.9447E−01 | 1.3141E−03 |
| A20 | 8.8308E+00 | −9.2869E−01 | 7.1861E−01 | 1.6940E−02 | −5.2090E−05 |

TABLE 5

Embodiment 2

| f (mm) | 2.034 | f1/sd1 | −4.812 |
|---|---|---|---|
| FNO | 2.288 | |CT4/R42| | 0.913 |
| FOV (degree) | 105.2 | CT2 (mm) | 0.742 |
| TTL (mm) | 4.3 | f12/f | 0.999 |
| ImgH (mm) | 2.42 | TTL/ImgH | 1.777 |
| sd1/ImgH | 0.351 | ET5/CT5 | 2.076 |
| n | 1.727 | f5/R52 | −4.102 |

Figure 4:
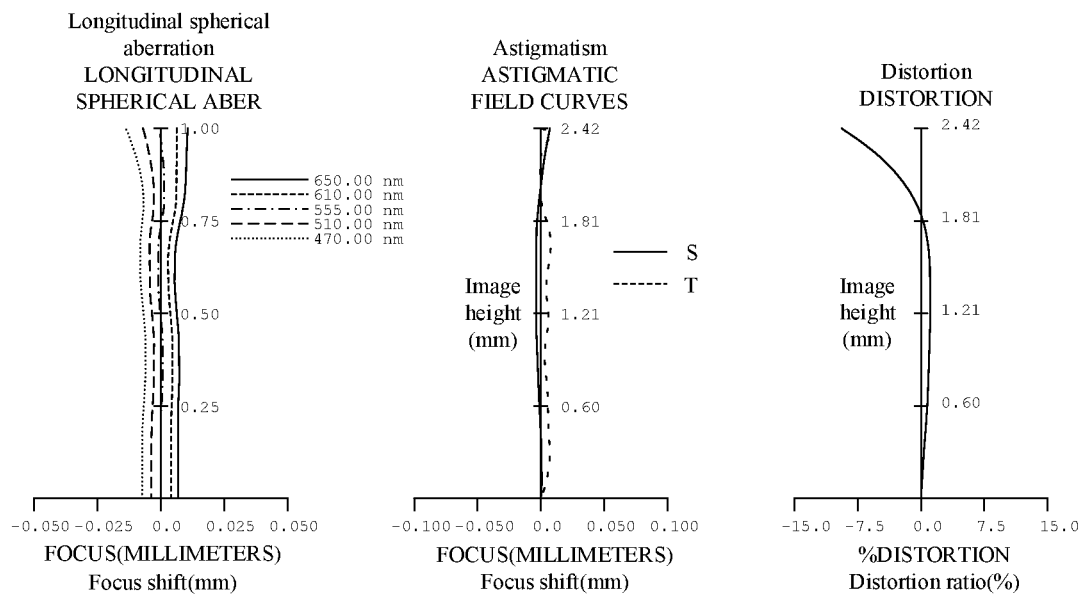
FIG. 4 shows a graph of longitudinal spherical aberration, a graph of astigmatism, and a graph of distortion of the wide-angle lens according to Embodiment 2 respectively.

FIG. 4 shows a graph of longitudinal spherical aberration, a graph of astigmatism, and a graph of distortion of the wide-angle lens 100 according to Embodiment 2 respectively, where a reference wavelength of the wide-angle lens 100 is 555 nm. The graph of longitudinal spherical aberration shows the deviation of the focus point of light rays with wavelengths of 470 nm, 510 nm, 555 nm, 610 nm and 650 nm after passing through the wide-angle lens 100; the graph of astigmatism shows the curvature of meridian image surface and the curvature of sagittal image surface of light rays with a wavelength of 555 nm after passing through the wide-angle lens 100; the graph of distortion shows the distortion ratio of light rays with a wavelength of 555 nm after passing through the wide-angle lens 100 at different image heights. According to FIG. 4, it can be seen that the wide-angle lens 100 provided in Embodiment 2 can achieve good imaging quality.

Embodiment 3

Figure 5:
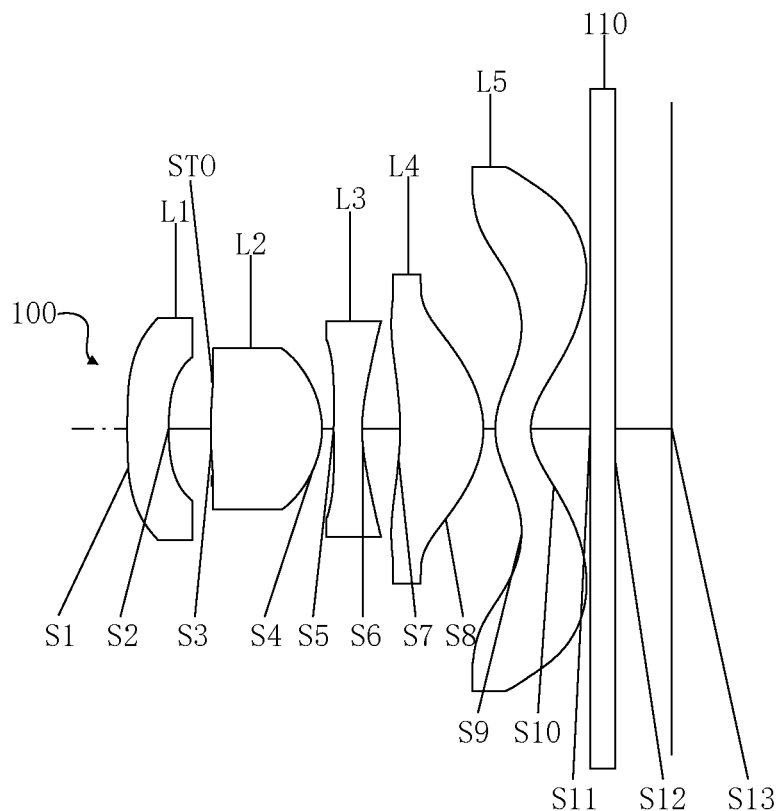
FIG. 5 shows a schematic structural diagram of a wide-angle lens according to Embodiment 3 of the present disclosure.

A wide-angle lens 100 of Embodiment 3 of the present disclosure will be described below with reference to FIGS. 5 to 6. In this embodiment, for brevity, some descriptions similar to those in Embodiment 1 will be omitted. FIG. 5 shows a schematic structural diagram of the wide-angle lens 100 according to Embodiment 3 of the present disclosure.

As shown in FIG. 5, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is convex at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is convex at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is concave at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is concave at its circumference, and the image side S8 is convex at the optical axis and is concave at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin and flat while achieving good optical imaging effects, thereby enabling the optical lens 100 to have a characteristic of miniaturization.

The first lens L1 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion.

Table 6 shows the surface type, radius of curvature, thickness, material, refractive index, Abbe number (that is, dispersion coefficient) and effective focal length of the lenses of the wide-angle lens 100 of Embodiment 3, where the units of the radius of curvature, thickness, and the effective focal length of the lenses are all millimeters (mm). Table 7 shows the high-order term coefficients that can be used for the lens aspheric surface S1-S10 in Embodiment 3, where the surface type of the aspherical surface can be defined by the equation (1) provided in Embodiment 1. Table 8 shows values of the relevant parameters of the wide-angle lens 100 provided in Embodiment 3.

TABLE 6

Embodiment 3
f= 1.911 mm, FNO = 2.4, FOV = 113.8°, TTL = 4.6 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | Infinite | | | | |
| S1 | First lens | Aspherical | 16.438 | 0.350 | Glass | 1.710 | 55.790 | −4.474 |
| S2 | | Aspherical | 2.646 | 0.361 | | | | |
| STO | Optical stop | Spherical | Infinite | −0.004 | | | | |
| S3 | Second lens | Aspherical | 4.432 | 0.938 | Plastic | 1.544 | 56.114 | 1.442 |
| S4 | | Aspherical | −0.885 | 0.100 | | | | |
| S5 | Third lens | Aspherical | 18.080 | 0.240 | Plastic | 1.661 | 20.370 | −2.843 |
| S6 | | Aspherical | 1.707 | 0.322 | | | | |
| S7 | Fourth lens | Aspherical | −2.408 | 0.702 | Plastic | 1.544 | 56.114 | 2.477 |
| S8 | | Aspherical | −0.955 | 0.100 | | | | |
| S9 | Fifth lens | Aspherical | 0.746 | 0.300 | Plastic | 1.534 | 55.771 | −5.679 |
| S10 | | Aspherical | 0.515 | 0.503 | | | | |
| S11 | Infrared filter | Spherical | Infinite | 0.212 | Glass | 1.517 | 64.167 | |
| S12 | | Spherical | Infinite | 0.477 | | | | |
| S13 | Imaging surface | Spherical | Infinite | 0.000 | | | | |

TABLE 7

Embodiment 3
Aspheric coefficient

| Surface number | S1 | S2 | S3 | S4 | S5 |
|---|---|---|---|---|---|
| K | 9.9000E+01 | 3.1465E+00 | −2.9314E+00 | −2.8919E+00 | −9.9000E+01 |
| A4 | 3.5130E−01 | 6.0323E−01 | −4.3222E−02 | −1.7467E−01 | −1.1311E−02 |
| A6 | −4.4795E−01 | −4.7255E−01 | 2.1193E+00 | −1.3290E+00 | −2.2122E+00 |
| A8 | 1.0468E+00 | 2.1345E+00 | −9.1514E+01 | 6.0211E+00 | 1.1062E+01 |
| A10 | −2.1381E+00 | −6.6431E+00 | 1.9314E+03 | −1.2312E+01 | −3.1598E+01 |
| A12 | 3.2175E+00 | 1.9857E+01 | −2.3516E+04 | 1.8898E+00 | 6.0685E+01 |
| A14 | −3.0947E+00 | 8.0468E−01 | 1.6890E+05 | 2.9054E+01 | −8.3600E+01 |

TABLE 7-continued

Embodiment 3
Aspheric coefficient

| | | | | | |
|---|---|---|---|---|---|
| A16 | 1.7622E+00 | −1.2081E+02 | −7.0441E+05 | −3.2104E+01 | 8.1234E+01 |
| A18 | −5.3973E−01 | 2.2102E+02 | 1.5694E+06 | −1.1937E+01 | −4.9770E+01 |
| A20 | 6.8381E−02 | −1.2526E+02 | −1.4373E+06 | 2.2973E+01 | 1.4001E+01 |

| Surface number | S6 | S7 | S8 | S9 | S10 |
|---|---|---|---|---|---|
| K | −6.1776E+00 | −4.0718E+01 | −1.3932E+00 | −2.7149E+00 | −1.4039E+00 |
| A4 | −3.1107E−02 | 3.4367E−02 | 4.1581E−03 | −1.6653E−01 | −7.4216E−01 |
| A6 | −8.7985E−01 | 1.7748E−02 | 4.6919E−02 | −4.1495E−01 | 7.3272E−01 |
| A8 | 3.7192E+00 | −5.1562E−01 | −2.2599E−01 | 7.2054E−01 | −5.1990E−01 |
| A10 | −7.9032E+00 | 1.6593E+00 | 3.7035E−01 | −5.4875E−01 | 2.7078E−01 |
| A12 | 1.0394E+01 | −2.3453E+00 | −2.2619E−01 | 2.3948E−01 | −1.0045E−01 |
| A14 | −8.7861E+00 | 1.7998E+00 | 8.8616E−02 | −6.3234E−02 | 2.5189E−02 |
| A16 | 4.6565E+00 | −7.7268E−01 | −4.1032E−02 | 1.0011E−02 | −3.9956E−03 |
| A18 | −1.4096E+00 | 1.7066E−01 | 1.4406E−02 | −8.7756E−04 | 3.5845E−04 |
| A20 | 1.8578E−01 | −1.4582E−02 | −1.9700E−03 | 3.2832E−05 | −1.3777E−05 |

TABLE 8

Embodiment 3

| | | | |
|---|---|---|---|
| f (mm) | 1.911 | f1/sd1 | −4.474 |
| FNO | 2.4 | |CT4/R42| | 0.735 |
| FOV (degree) | 113.8 | CT2 (mm) | 0.938 |
| TTL (mm) | 4.6 | f12/f | 0.868 |
| ImgH (mm) | 2.93 | TTL/ImgH | 1.57 |
| sd1/ImgH | 0.341 | ET5/CT5 | 0.947 |
| n | 1.71 | f5/R52 | −11.027 |

Figure 6:
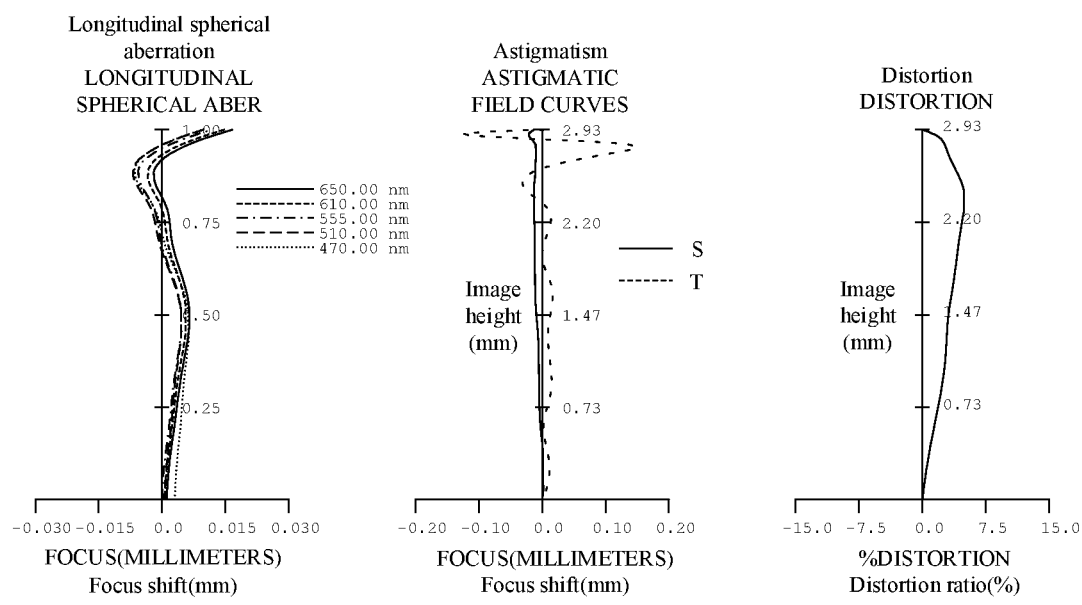
FIG. 6 shows a graph of longitudinal spherical aberration, a graph of astigmatism, and a graph of distortion of the wide-angle lens according to Embodiment 3 respectively.

FIG. 6 shows a graph of longitudinal spherical aberration, a graph of astigmatism, and a graph of distortion of the wide-angle lens 100 according to Embodiment 3 respectively, where a reference wavelength of the wide-angle lens 100 is 555 nm. The graph of longitudinal spherical aberration shows the deviation of the focus point of light rays with wavelengths of 470 nm, 510 nm, 555 nm, 610 nm and 650 nm after passing through the wide-angle lens 100; the graph of astigmatism shows the curvature of meridian image surface and the curvature of sagittal image surface of light rays with a wavelength of 555 nm after passing through the wide-angle lens 100; the graph of distortion shows the distortion ratio of light rays with a wavelength of 555 nm after passing through the wide-angle lens 100 at different image heights. According to FIG. 6, it can be seen that the wide-angle lens 100 provided in Embodiment 3 can achieve good imaging quality.

Embodiment 4

Figure 7:
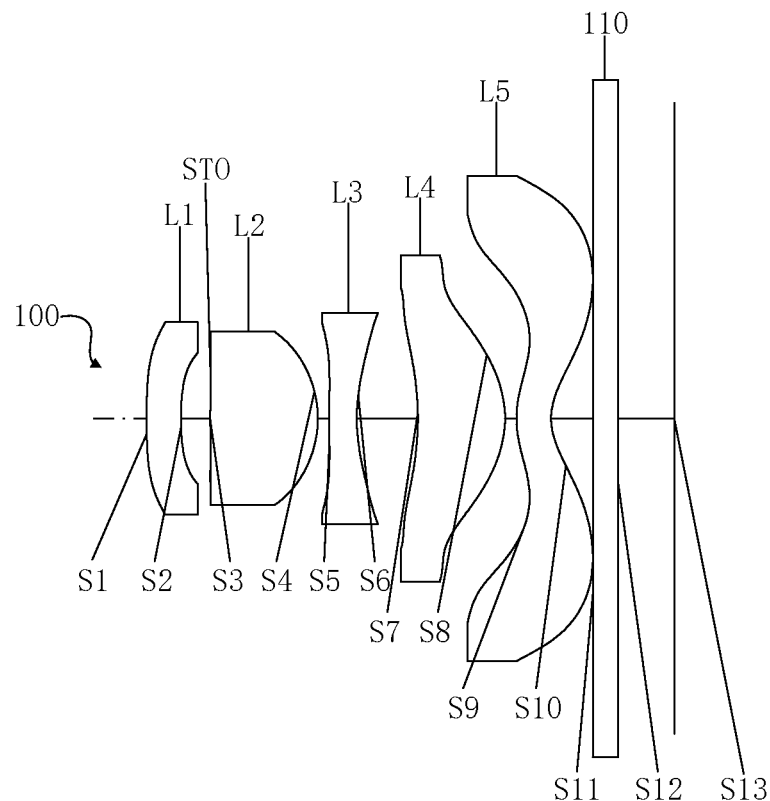
FIG. 7 shows a schematic structural diagram of a wide-angle lens according to Embodiment 4 of the present disclosure.

A wide-angle lens 100 of Embodiment 4 of the present disclosure will be described below with reference to FIGS. 7 to 8. In this embodiment, for brevity, some descriptions similar to those in Embodiment 1 will be omitted. FIG. 7 shows a schematic structural diagram of the wide-angle lens 100 according to Embodiment 4 of the present disclosure.

As shown in FIG. 7, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is convex at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is concave at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is concave at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is concave at its circumference, and the image side S8 is convex at the optical axis and is convex at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin, and flat while achieving good optical imaging effects, thereby enabling the optical lens 100 to have a characteristic of miniaturization.

The second lens L2 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion.

Table 9 shows the surface type, radius of curvature, thickness, material, refractive index, Abbe number (that is, dispersion coefficient) and effective focal length of the lenses of the wide-angle lens 100 of Embodiment 4, where the units of the radius of curvature, thickness, and the effective focal length of the lenses are all millimeters (mm). Table 10 shows the high-order term coefficients that can be used for the lens aspheric surface S1-S10 in Embodiment 4, where the surface type of the aspherical surface can be defined by the equation (1) provided in Embodiment 1. Table 11 shows values of the relevant parameters of the wide-angle lens 100 provided in Embodiment 4.

TABLE 9

Embodiment 4
f = 2.295 mm, FNO = 2.4, FOV = 109.7°, TTL = 4.6 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | Infinite | | | | |
| S1 | First lens | Aspherical | 12.065 | 0.300 | Plastic | 1.544 | 56.114 | −8.288 |
| S2 | | Aspherical | 3.261 | 0.251 | | | | |
| STO | Optical stop | Spherical | Infinite | 0.003 | | | | |
| S3 | Second lens | Aspherical | 17.907 | 0.938 | Glass | 1.708 | 49.020 | 1.448 |
| S4 | | Aspherical | −1.068 | 0.100 | | | | |
| S5 | Third lens | Aspherical | 14.987 | 0.240 | Plastic | 1.661 | 20.370 | −2.938 |
| S6 | | Aspherical | 1.722 | 0.533 | | | | |
| S7 | Fourth lens | Aspherical | −2.710 | 0.759 | Plastic | 1.544 | 56.114 | 2.767 |
| S8 | | Aspherical | −1.066 | 0.100 | | | | |
| S9 | Fifth lens | Aspherical | 1.014 | 0.302 | Plastic | 1.534 | 55.771 | −3.739 |
| S10 | | Aspherical | 0.604 | 0.364 | | | | |
| S11 | Infrared filter | Spherical | Infinite | 0.219 | Glass | 1.517 | 64.167 | |
| S12 | | Spherical | Infinite | 0.491 | | | | |
| S13 | Imaging surface | Spherical | Infinite | 0.000 | | | | |

TABLE 10

Embodiment 4
Aspheric coefficient

| Surface number | S1 | S2 | S3 | S4 | S5 |
|---|---|---|---|---|---|
| K | −9.9000E+01 | 5.7102E+00 | −7.0295E+00 | −3.1604E+00 | 9.9000E+01 |
| A4 | 2.7959E−01 | 5.2674E−01 | −1.4571E−02 | −1.2358E−01 | −9.5731E−02 |
| A6 | −9.6420E−02 | 4.6645E−01 | −1.2892E−01 | −1.6202E+00 | −9.5110E−01 |
| A8 | −5.3897E−01 | −1.0359E+01 | 6.7214E+00 | 1.2185E+01 | 5.8529E+00 |
| A10 | 4.0418E+00 | 1.1901E+02 | −2.7613E+02 | −6.0528E+01 | −1.9854E+01 |
| A12 | −1.3910E+01 | −7.5619E+02 | 4.1786E+03 | 1.9386E+02 | 3.7415E+01 |
| A14 | 2.7452E+01 | 2.8957E+03 | −3.2976E+04 | −4.0257E+02 | −3.4865E+01 |
| A16 | −3.1385E+01 | −6.4580E+03 | 1.4356E+05 | 5.2303E+02 | 6.0153E+00 |
| A18 | 1.9131E+01 | 7.6069E+03 | −3.2715E+05 | −3.8609E+02 | 1.4691E+01 |
| A20 | −4.7775E+00 | −3.6011E+03 | 3.0497E+05 | 1.2320E+02 | −8.5216E+00 |

| Surface number | S6 | S7 | S8 | S9 | S10 |
|---|---|---|---|---|---|
| K | −4.9452E+00 | −1.2126E+01 | −1.3410E+00 | −2.6504E+00 | −1.4111E+00 |
| A4 | −1.9030E−01 | 2.7447E−02 | 1.8311E−02 | −4.5413E−01 | −7.7987E−01 |
| A6 | 4.8850E−01 | −1.6079E−01 | 1.1622E−01 | 1.2546E−01 | 8.2409E−01 |
| A8 | −1.5545E+00 | 1.3045E−01 | −7.1911E−01 | −5.2695E−03 | −6.2439E−01 |
| A10 | 5.7264E+00 | 5.7346E−01 | 1.5243E+00 | 1.4875E−01 | 3.4041E−01 |
| A12 | −1.6294E+01 | −1.3165E+00 | −1.6899E+00 | −2.1773E−01 | −1.2952E−01 |
| A14 | 2.9497E+01 | 1.2720E+00 | 1.1403E+00 | 1.2911E−01 | 3.2892E−02 |
| A16 | −3.1670E+01 | −6.7940E−01 | −4.6643E−01 | −3.8689E−02 | −5.2537E−03 |
| A18 | 1.8480E+01 | 2.0237E−01 | 1.0496E−01 | 5.8280E−03 | 4.7373E−04 |
| A20 | −4.5231E+00 | −2.7688E−02 | −9.8982E−03 | −3.5198E−04 | −1.8296E−05 |

TABLE 11

| Embodiment 4 | | | |
|---|---|---|---|
| f (mm) | 2.295 | f1/sd1 | −9.25 |
| FNO | 2.4 | |CT4/R42| | 0.712 |
| FOV (degree) | 109.7 | CT2 (mm) | 0.938 |
| TTL (mm) | 4.6 | f12/f | 0.693 |
| ImgH (mm) | 2.94 | TTL/ImgH | 1.565 |
| sd1/ImgH | 0.305 | ET5/CT5 | 1.434 |
| n | 1.708 | f5/R52 | −6.19 |

Figure 8:
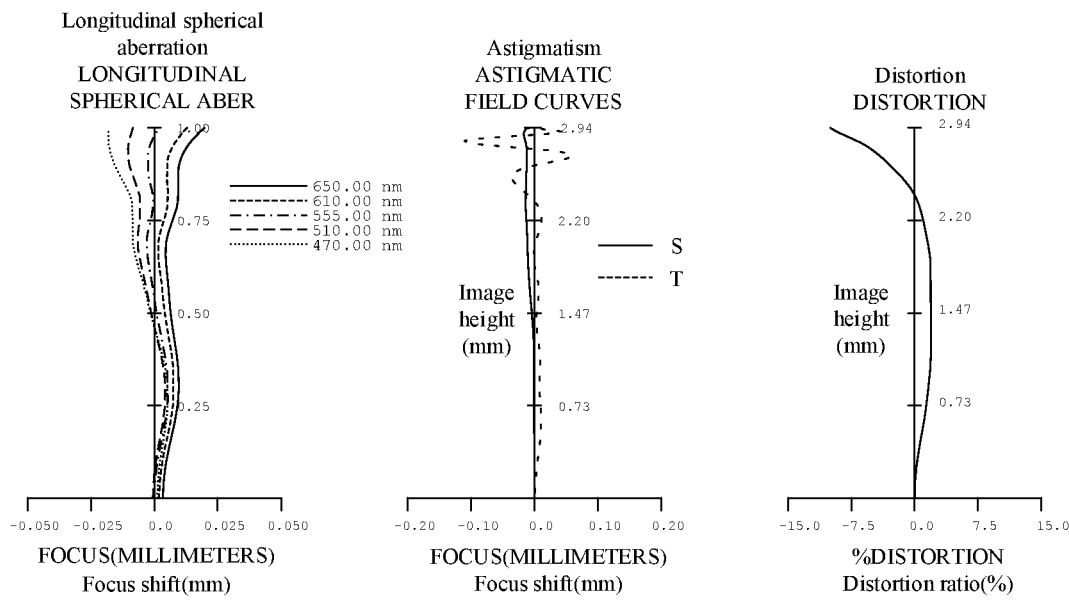
FIG. 8 shows a graph of longitudinal spherical aberration, a graph of astigmatism, and a graph of distortion of the wide-angle lens according to Embodiment 4 respectively.

FIG. 8 shows a graph of longitudinal spherical aberration, a graph of astigmatism, and a graph of distortion of the wide-angle lens 100 according to Embodiment 4 respectively, where a reference wavelength of the wide-angle lens 100 is 555 nm. The graph of longitudinal spherical aberration shows the deviation of the focus point of light rays with wavelengths of 470 nm, 510 nm, 555 nm, 610 nm, and 650 nm after passing through the wide-angle lens 100; the graph of astigmatism shows the curvature of meridian image surface and the curvature of sagittal image surface of light rays with a wavelength of 555 nm after passing through the wide-angle lens 100; the graph of distortion shows the distortion ratio of light rays with a wavelength of 555 nm after passing through the wide-angle lens 100 at different image heights. According to FIG. 8, it can be seen that the wide-angle lens 100 provided in Embodiment 4 can achieve good imaging quality.

Embodiment 5

Figure 9:
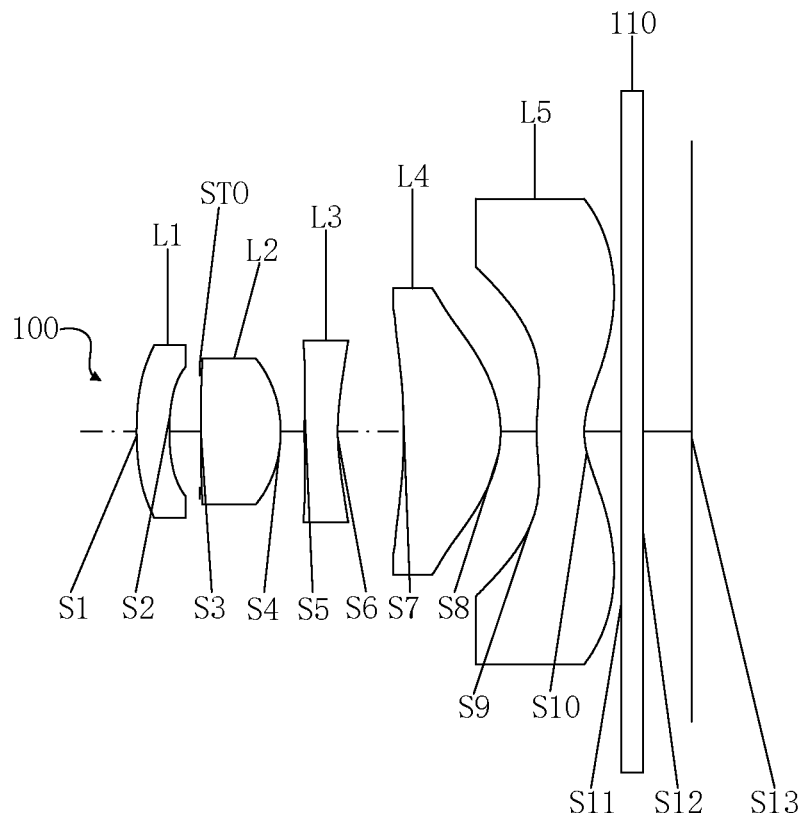
FIG. 9 shows a schematic structural diagram of a wide-angle lens according to Embodiment 5 of the present disclosure.

A wide-angle lens 100 of Embodiment 5 of the present disclosure will be described below with reference to FIGS. 9 to 10. In this embodiment, for brevity, some descriptions similar to those in Embodiment 1 will be omitted. FIG. 9 shows a schematic structural diagram of the wide-angle lens 100 according to Embodiment 5 of the present disclosure.

As shown in FIG. 9, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is convex at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is convex at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is concave at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is concave at its circumference, and the image side S8 is convex at the optical axis and is convex at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin and flat while achieving good optical imaging effects, thereby enabling the optical lens 100 to have a characteristic of miniaturization.

The first lens L1 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion.

Table 12 shows the surface type, radius of curvature, thickness, material, refractive index, Abbe number (that is, dispersion coefficient) and effective focal length of the lenses of the wide-angle lens 100 of Embodiment 5, where the units of the radius of curvature, thickness, and the effective focal length of the lenses are all millimeters (mm). Table 13 shows the high-order term coefficients that can be used for the lens aspheric surface S1-S10 in Embodiment 5, where the surface type of the aspherical surface can be defined by the equation (1) provided in Embodiment 1. Table 14 shows values of the relevant parameters of the wide-angle lens 100 provided in Embodiment 5.

TABLE 12

Embodiment 5
f = 2.981 mm, FNO = 2.6, FOV = 90.9°, TTL = 5.25 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | Infinite | | | | |
| S1 | First lens | Aspherical | 3.673 | 0.310 | Glass | 1.705 | 28.210 | −13.335 |
| S2 | | Aspherical | 2.549 | 0.286 | | | | |
| STO | Optical stop | Spherical | Infinite | 0.010 | | | | |
| S3 | Second lens | Aspherical | 23.562 | 0.757 | Plastic | 1.560 | 51.830 | 2.323 |

TABLE 12-continued

Embodiment 5
f = 2.981 mm, FNO = 2.6, FOV = 90.9°, TTL = 5.25 mm

| Surface number | Surface name | Surface type | Radius of curvature | Thickness | Material | Refractive index | Abbe number | Focal length |
|---|---|---|---|---|---|---|---|---|
| S4 | | Aspherical | −1.362 | 0.224 | | | | |
| S5 | Third lens | Aspherical | 8.390 | 0.316 | Plastic | 1.671 | 19.243 | −5.657 |
| S6 | | Aspherical | 2.575 | 0.624 | | | | |
| S7 | Fourth lens | Aspherical | −6.367 | 0.917 | Plastic | 1.627 | 39.350 | 2.369 |
| S8 | | Aspherical | −1.271 | 0.341 | | | | |
| S9 | Fifth lens | Aspherical | 2.879 | 0.450 | Plastic | 1.636 | 23.785 | −2.216 |
| S10 | | Aspherical | 0.888 | 0.350 | | | | |
| S11 | Infrared filter | Spherical | Infinite | 0.210 | Glass | 1.517 | 64.167 | |
| S12 | | Spherical | Infinite | 0.455 | | | | |
| S13 | Imaging surface | Spherical | Infinite | 0.000 | | | | |

TABLE 13

Embodiment 5
Aspheric coefficient

| Surface number | S1 | S2 | S3 | S4 | S5 |
|---|---|---|---|---|---|
| K | −5.6249E+01 | −2.2838E+00 | 3.9349E+01 | −3.3133E+00 | 6.7806E+01 |
| A4 | 2.7568E−01 | 3.2524E−01 | 4.5881E−02 | −2.2440E−01 | −2.2923E−01 |
| A6 | −3.0155E−01 | −1.8389E−01 | −5.5597E−01 | 9.5516E−02 | 4.0762E−01 |
| A8 | 5.7623E−01 | 3.5435E+00 | 8.0154E+00 | 5.0787E−01 | −8.0319E−01 |
| A10 | −9.6861E−01 | −3.1468E+01 | −7.2360E+01 | −5.6675E+00 | 1.3852E+00 |
| A12 | 1.1415E+00 | 1.8743E+02 | 3.9411E+02 | 2.4347E+01 | −2.4544E+00 |
| A14 | −1.1506E+00 | −6.9806E+02 | −1.3102E+03 | −6.2972E+01 | 3.9133E+00 |
| A16 | 1.2709E+00 | 1.5872E+03 | 2.5884E+03 | 9.8115E+01 | −4.4136E+00 |
| A18 | −1.2146E+00 | −2.0103E+03 | −2.7695E+03 | −8.3281E+01 | 2.9561E+00 |
| A20 | 5.1066E−01 | 1.0888E+03 | 1.2273E+03 | 2.9181E+01 | −8.6659E−01 |

| Surface number | S6 | S7 | S8 | S9 | S10 |
|---|---|---|---|---|---|
| K | −5.8701E+00 | 1.1673E+00 | −1.0688E+00 | −2.9028E+00 | −1.2523E+00 |
| A4 | −1.6631E−01 | 1.9008E−02 | 3.6484E−02 | −3.5681E−01 | −5.8004E−01 |
| A6 | 2.7771E−01 | −9.4028E−02 | −5.7797E−03 | −1.1742E−01 | 5.2491E−01 |
| A8 | −3.5069E−01 | 2.2172E−01 | −1.9300E−01 | 3.6562E−01 | −3.3847E−01 |
| A10 | 4.7079E−01 | −3.0830E−01 | 5.4173E−01 | −4.2807E−01 | 1.5346E−01 |
| A12 | −1.0176E+00 | 3.1585E−01 | −7.0599E−01 | 2.5842E−01 | −4.8071E−02 |
| A14 | 1.9192E+00 | −2.1394E−01 | 5.2255E−01 | −9.1438E−02 | 1.0114E−02 |
| A16 | −2.1855E+00 | 8.4251E−02 | −2.2027E−01 | 1.8974E−02 | −1.3580E−03 |
| A18 | 1.3256E+00 | −1.6909E−02 | 4.8798E−02 | −2.1322E−03 | 1.0478E−04 |
| A20 | −3.2793E−01 | 1.1427E−03 | −4.3959E−03 | 1.0002E−04 | −3.5264E−06 |

TABLE 14

Embodiment 5

| f (mm) | 2.981 | f1/sd1 | −15.233 |
|---|---|---|---|
| FNO | 2.6 | |CT4/R42| | 0.721 |
| FOV (degree) | 90.9 | CT2 (mm) | 0.757 |
| TTL (mm) | 5.25 | f12/f | 0.919 |
| ImgH (mm) | 2.93 | TTL/ImgH | 1.792 |
| sd1/ImgH | 0.299 | ET5/CT5 | 2.273 |
| n | 1.705 | f5/R52 | −2.495 |

Figure 10:
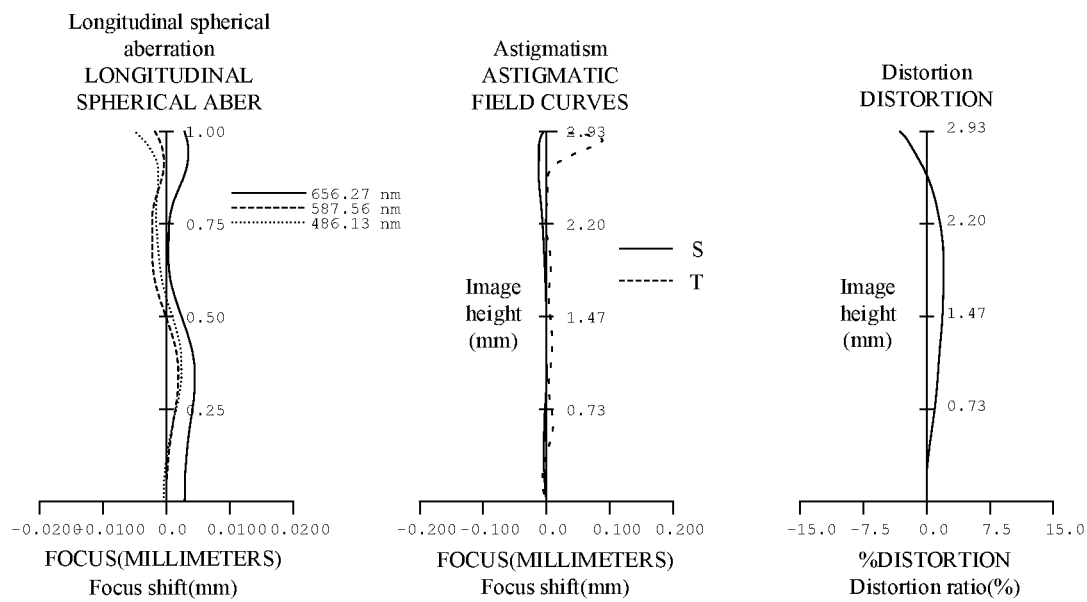
FIG. 10 shows a graph of longitudinal spherical aberration, a graph of astigmatism, and a graph of distortion of the wide-angle lens according to Embodiment 5 respectively.

FIG. 10 shows a graph of longitudinal spherical aberration, a graph of astigmatism, and a graph of distortion of the wide-angle lens 100 according to Embodiment 5 respectively, where a reference wavelength of the wide-angle lens 100 is 587.56 nm. The graph of longitudinal spherical aberration shows the deviation of the focus point of light rays with wavelengths of 486.13 nm, 587.56 nm, and 656.27 nm after passing through the wide-angle lens 100; the graph of astigmatism shows the curvature of meridian image surface and the curvature of sagittal image surface of light rays with a wavelength of 587.56 nm after passing through the wide-angle lens 100; the graph of distortion shows the distortion ratio of light rays with a wavelength of 587.56 nm after passing through the wide-angle lens 100 at different image heights. According to FIG. 10, it can be seen that the wide-angle lens 100 provided in Embodiment 5 can achieve good imaging quality.

Embodiment 6

Figure 11:
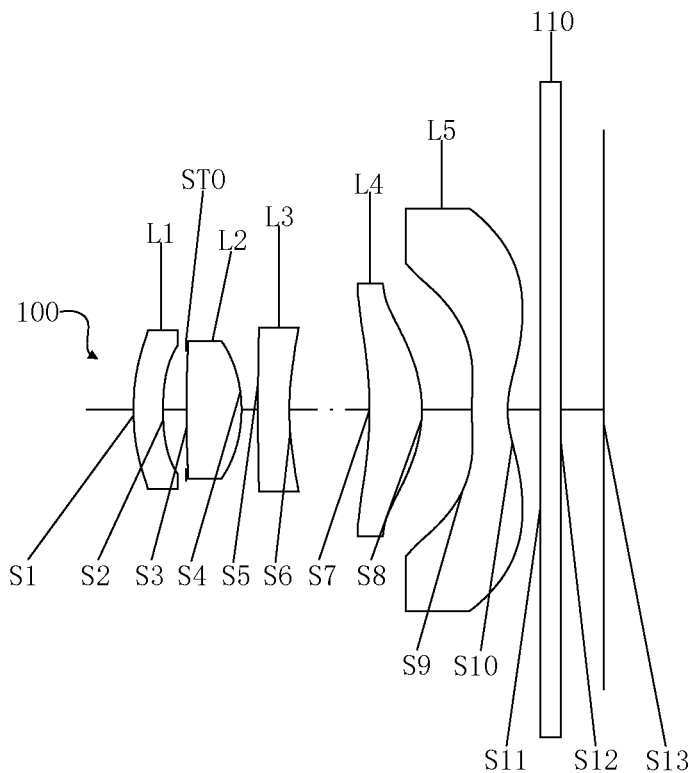
FIG. 11 shows a schematic structural diagram of a wide-angle lens according to Embodiment 6 of the present disclosure.

A wide-angle lens 100 of Embodiment 6 of the present disclosure will be described below with reference to FIGS. 11 to 12. In this embodiment, for brevity, some descriptions similar to those in Embodiment 1 will be omitted. FIG. 11 shows a schematic structural diagram of the wide-angle lens 100 according to Embodiment 6 of the present disclosure.

As shown in FIG. 11, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is convex at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is convex at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is convex at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is concave at its circumference, and the image side S8 is convex at the optical axis and is convex at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin and flat while achieving good optical imaging effects, thereby enabling the optical lens 100 to have a characteristic of miniaturization.

The first lens L1 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion.

Table 15 shows the surface type, radius of curvature, thickness, material, refractive index, Abbe number (that is, dispersion coefficient) and effective focal length of the lenses of the wide-angle lens 100 of Embodiment 6, where the units of the radius of curvature, thickness, and the effective focal length of the lenses are all millimeters (mm). Table 16 shows the high-order term coefficients that can be used for the lens aspheric surface S1-S10 in Embodiment 6, where the surface type of the aspherical surface can be defined by the equation (1) provided in Embodiment 1. Table 17 shows values of the relevant parameters of the wide-angle lens 100 provided in Embodiment 6.

TABLE 15

Embodiment 6
f = 3.441 mm, FNO = 2.6, FOV = 80°, TTL = 4.8 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | Infinite | | | | |
| S1 | First lens | Aspherical | 2.689 | 0.300 | Glass | 1.705 | 28.210 | −132.684 |
| S2 | | Aspherical | 2.493 | 0.239 | | | | |
| STO | Optical stop | Spherical | Infinite | 0.003 | | | | |
| S3 | Second lens | Aspherical | 25.860 | 0.559 | Plastic | 1.569 | 55.030 | 2.588 |
| S4 | | Aspherical | −1.550 | 0.165 | | | | |
| S5 | Third lens | Aspherical | 7.571 | 0.322 | Plastic | 1.671 | 19.243 | −5.968 |
| S6 | | Aspherical | 2.575 | 0.819 | | | | |
| S7 | Fourth lens | Aspherical | −4.416 | 0.536 | Plastic | 1.667 | 26.820 | 2.994 |
| S8 | | Aspherical | −1.442 | 0.510 | | | | |
| S9 | Fifth lens | Aspherical | 4.428 | 0.364 | Plastic | 1.636 | 23.785 | −2.177 |
| S10 | | Aspherical | 1.020 | 0.334 | | | | |
| S11 | Infrared filter | Spherical | Infinite | 0.210 | Glass | 1.517 | 64.167 | |
| S12 | | Spherical | Infinite | 0.439 | | | | |
| S13 | Imaging surface | Spherical | Infinite | 0.000 | | | | |

TABLE 16

Embodiment 6
Aspheric coefficient

| Surface number | S1 | S2 | S3 | S4 | S5 |
|---|---|---|---|---|---|
| K | −5.8928E+01 | −6.9883E+00 | −2.4868E+00 | −3.4318E+00 | 7.0968E+01 |
| A4 | 4.4495E−01 | 2.5989E−01 | 2.7189E−02 | −2.4262E−01 | −2.9026E−01 |

TABLE 16-continued

Embodiment 6
Aspheric coefficient

| | | | | | |
|---|---|---|---|---|---|
| A6 | −1.3087E+00 | 4.6335E−01 | −1.0735E−01 | −2.5421E−01 | 4.8285E−01 |
| A8 | 4.7204E+00 | −5.8859E+00 | 8.5261E−01 | 7.8914E+00 | 8.2332E−01 |
| A10 | −1.4469E+01 | 4.9415E+01 | −1.0003E+00 | −6.3493E+01 | −9.3025E+00 |
| A12 | 3.3980E+01 | −2.3579E+02 | −2.0885E+01 | 2.8389E+02 | 3.4744E+01 |
| A14 | −5.7934E+01 | 6.8101E+02 | 1.5102E+02 | −7.7186E+02 | −7.4383E+01 |
| A16 | 6.5025E+01 | −1.1808E+03 | −4.7267E+02 | 1.2627E+03 | 9.4054E+01 |
| A18 | −4.2288E+01 | 1.1341E+03 | 7.2910E+02 | −1.1446E+03 | −6.5493E+01 |
| A20 | 1.1812E+01 | −4.7197E+02 | −4.5533E+02 | 4.4165E+02 | 1.9322E+01 |

| Surface number | S6 | S7 | S8 | S9 | S10 |
|---|---|---|---|---|---|
| K | −4.9160E+00 | −3.1536E+00 | −1.2872E+00 | −1.0891E+01 | −1.1663E+00 |
| A4 | −1.8842E−01 | 5.0397E−02 | 7.5952E−02 | −4.8640E−01 | −7.4984E−01 |
| A6 | 2.5568E−01 | −2.4554E−01 | −3.3895E−01 | −9.8438E−02 | 8.4680E−01 |
| A8 | 4.1733E−01 | 6.2226E−01 | 9.6613E−01 | 1.4283E+00 | −6.8497E−01 |
| A10 | −3.5900E+00 | −7.5471E−01 | −1.6675E+00 | −2.5679E+00 | 3.8468E−01 |
| A12 | 1.1271E+01 | 2.9012E−01 | 1.9749E+00 | 2.4662E+00 | −1.4909E−01 |
| A14 | −2.0611E+01 | 3.6534E−01 | −1.6025E+00 | −1.4369E+00 | 3.8986E−02 |
| A16 | 2.2502E+01 | −5.2110E−01 | 8.4663E−01 | 5.0601E−01 | −6.5541E−03 |
| A18 | −1.3639E+01 | 2.5773E−01 | −2.5687E−01 | −9.8501E−02 | 6.3899E−04 |
| A20 | 3.5375E+00 | −4.8046E−02 | 3.3251E−02 | 8.0881E−03 | −2.7445E−05 |

TABLE 17

Embodiment 6

| | | | |
|---|---|---|---|
| f (mm) | 3.441 | f1/sd1 | −159.094 |
| FNO | 2.6 | |CT4/R42| | 0.372 |
| FOV (degree) | 80 | CT2 (mm) | 0.559 |
| TTL (mm) | 4.8 | f12/f | 0.801 |
| ImgH (mm) | 2.93 | TTL/ImgH | 1.638 |
| sd1/ImgH | 0.285 | ET5/CT5 | 1.769 |
| n | 1.705 | f5/R52 | −2.134 |

Figure 12:
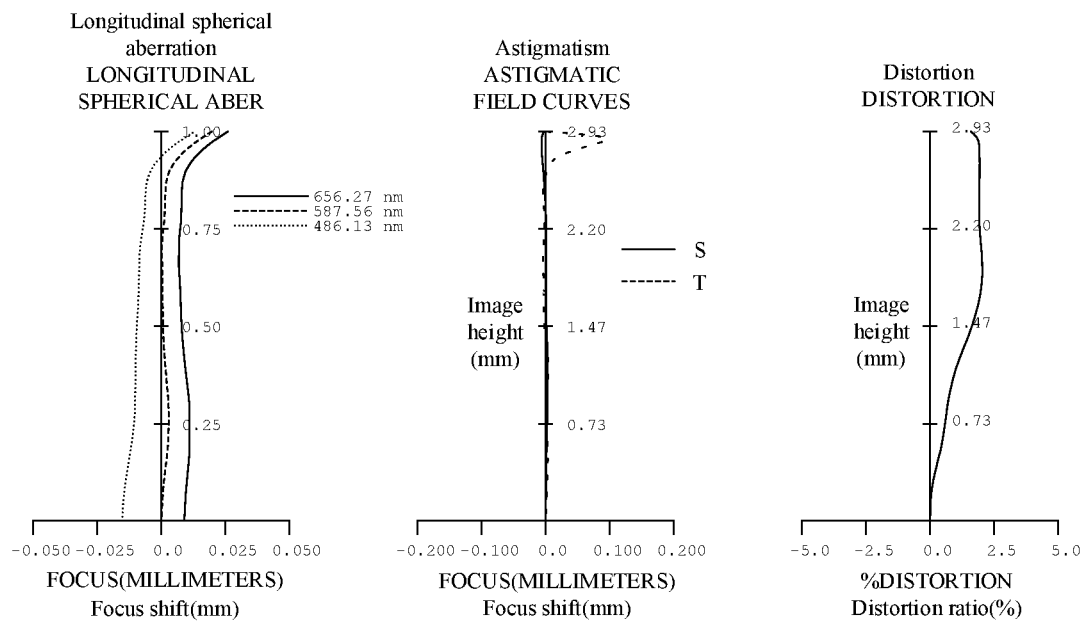
FIG. 12 shows a graph of longitudinal spherical aberration, a graph of astigmatism, and a graph of distortion of the wide-angle lens according to Embodiment 6 respectively.

FIG. 12 shows a graph of longitudinal spherical aberration, a graph of astigmatism, and a graph of distortion of the wide-angle lens 100 according to Embodiment 6 respectively, where a reference wavelength of the wide-angle lens 100 is 587.56 nm. The graph of longitudinal spherical aberration shows the deviation of the focus point of light rays with wavelengths of 486.13 nm, 587.56 nm, and 656.27 nm after passing through the wide-angle lens 100; the graph of astigmatism shows the curvature of meridian image surface and the curvature of sagittal image surface of light rays with a wavelength of 587.56 nm after passing through the wide-angle lens 100; the graph of distortion shows the distortion ratio of light rays with a wavelength of 587.56 nm after passing through the wide-angle lens 100 at different image heights. According to FIG. 12, it can be seen that the wide-angle lens 100 provided in Embodiment 6 can achieve good imaging quality.

Embodiment 7

Figure 13:
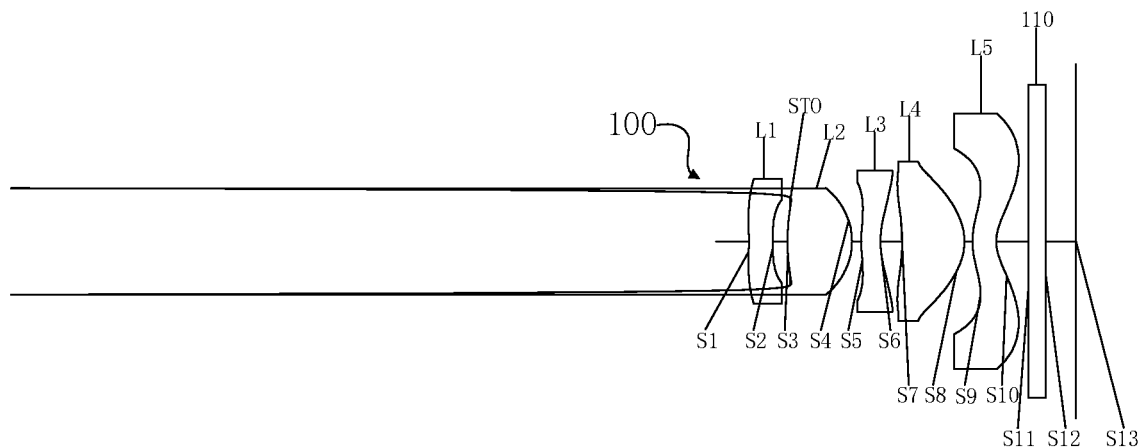
FIG. 13 shows a schematic structural diagram of a wide-angle lens according to Embodiment 7 of the present disclosure.

A wide-angle lens 100 of Embodiment 7 of the present disclosure will be described below with reference to FIGS. 13 to 14. In this embodiment, for brevity, some descriptions similar to those in Embodiment 1 will be omitted. FIG. 13 shows a schematic structural diagram of the wide-angle lens 100 according to Embodiment 7 of the present disclosure.

As shown in FIG. 11, the wide-angle lens 100 includes a first lens L1, a second lens L2, a third lens L3, a fourth lens L4, a fifth lens L5, and an imaging surface S13 in sequence from an object side to an image side along an optical axis.

The first lens L1 has a negative focal power, and its object side surface S1 and its image side surface S2 are both aspherical. The object side surface S1 is concave at the optical axis and is convex at its circumference, and the image side S2 is concave at the optical axis and is concave at its circumference.

The second lens L2 has a positive focal power, and its object side surface S3 and its image side surface S4 are both aspherical. The object side surface S3 is convex at the optical axis and is convex at its circumference, and the image side surface S4 is convex at the optical axis and is convex at its circumference.

The third lens L3 has a negative focal power, and its object side surface S5 and its image side surface S6 are both aspherical. The object side surface S5 is convex at the optical axis and is concave at its circumference, and the image side surface S6 is concave at the optical axis and is concave at its circumference.

The fourth lens L4 has a positive focal power, and its object side surface S7 and its image side surface S8 are both aspherical. The object side surface S7 is concave at the optical axis and is convex at its circumference, and the image side S8 is convex at the optical axis and is convex at its circumference.

The fifth lens L5 has a negative focal power, and its object side surface S9 and its image side surface S10 are both aspherical. The object side surface S9 is convex at the optical axis and is concave at its circumference, and the image side surface S10 is concave at the optical axis and is convex at its circumference.

Configuring the object side surfaces and the image side surfaces of the first lens L1 to the fifth lens L5 to be aspherical is conducive to correcting aberrations and solve the problem of image surface distortion, and can also enable the lens being small, thin and flat while achieving good optical imaging effects, thereby enabling the optical lens 100 to have a characteristic of miniaturization.

The first lens L1 is configured to be made of glass, and the use of glass lenses can make the wide-angle lens 100 have a small temperature drift under different temperature changing environments, so that it has relatively good temperature tolerance characteristics. The wide-angle lens 100 has relatively good optical transfer function, which is conducive to improve the imaging resolution of the wide-angle lens 100.

An optical stop STO is further disposed between the first lens L1 and the second lens L2 to limit a size of an incident light beam and further improve the imaging quality of the wide-angle lens 100. The wide-angle lens 100 further includes an optical filter 110 disposed on the image side of the fifth lens and having an object side surface S11 and an image side surface S12. The light from the object OBJ sequentially passes through the respective surfaces S1 to S12 and is finally imaged on the imaging surface S13. Further, the optical filter 110 is an infrared filter, which is configured to filter infrared light rays from external light rays incident on the wide-angle lens 100 to avoid image color distortion.

Table 18 shows the surface type, radius of curvature, thickness, material, refractive index, Abbe number (that is, dispersion coefficient) and effective focal length of the lenses of the wide-angle lens 100 of Embodiment 7, where the units of the radius of curvature, thickness, and the effective focal length of the lenses are all millimeters (mm). Table 19 shows the high-order term coefficients that can be used for the lens aspheric surface S1-S10 in Embodiment 7, where the surface type of the aspherical surface can be defined by the equation (1) provided in Embodiment 1. Table 20 shows values of the relevant parameters of the wide-angle lens 100 provided in Embodiment 7.

TABLE 18

Embodiment 7
f = 1.683 mm, FNO = 2.0, FOV = 114°, TTL = 4.12 mm

| Surface number | Surface name | Surface type | Radius of curvature | Thickness | Material | Refractive index | Abbe number | Focal length |
|---|---|---|---|---|---|---|---|---|
| OBJ | Object surface | Spherical | Infinite | 404.000 | | | | |
| S1 | First lens | Aspherical | −5.769 | 0.300 | Glass | 1.826 | 54.140 | −2.968 |
| S2 | | Aspherical | 4.390 | 0.222 | | | | |
| STO | Optical stop | Spherical | Infinite | −0.033 | | | | |
| S3 | Second lens | Aspherical | 3.408 | 0.811 | Plastic | 1.544 | 56.114 | 1.381 |
| S4 | | Aspherical | −0.887 | 0.119 | | | | |
| S5 | Third lens | Aspherical | 2.171 | 0.240 | Plastic | 1.640 | 23.530 | −3.730 |
| S6 | | Aspherical | 1.092 | 0.275 | | | | |
| S7 | Fourth lens | Aspherical | −2.133 | 0.785 | Plastic | 1.544 | 56.114 | 1.614 |
| S8 | | Aspherical | −0.705 | 0.100 | | | | |
| S9 | Fifth lens | Aspherical | 0.992 | 0.300 | Plastic | 1.636 | 23.785 | −2.533 |
| S10 | | Aspherical | 0.543 | 0.408 | | | | |
| S11 | Infrared filter | Spherical | Infinite | 0.212 | Glass | 1.517 | 64.167 | |
| S12 | | Spherical | Infinite | 0.383 | | | | |
| S13 | Imaging surface | Spherical | Infinite | 0.000 | | | | |

TABLE 19

Embodiment 7
Aspheric coefficient

| Surface number | S1 | S2 | S3 | S4 | S5 |
|---|---|---|---|---|---|
| K | 6.5709E+00 | 6.0291E+01 | 1.6295E+01 | −1.9388E+00 | −9.9000E+01 |
| A4 | 5.8210E−01 | 8.9799E−01 | 2.1972E−01 | −6.9293E−01 | −5.2944E−02 |
| A6 | −9.8560E−01 | 3.0305E−01 | −9.0711E−01 | 4.5660E+00 | −4.3544E+00 |
| A8 | 2.1518E+00 | −2.7213E+01 | −1.3551E+01 | −3.8636E+01 | 4.0222E+01 |
| A10 | −5.8552E+00 | 3.8132E+02 | 4.1645E+02 | 2.3374E+02 | −2.3313E+02 |
| A12 | 1.5485E+01 | −3.0793E+03 | −5.3906E+03 | −9.6220E+02 | 8.7618E+02 |
| A14 | −3.3147E+01 | 1.5533E+04 | 3.8338E+04 | 2.5503E+03 | −2.1266E+03 |
| A16 | 4.8735E+01 | −4.8324E+04 | −1.5556E+05 | −4.1467E+03 | 3.1950E+03 |
| A18 | −4.1432E+01 | 8.5153E+04 | 3.3859E+05 | 3.7637E+03 | −2.6847E+03 |
| A20 | 1.5086E+01 | −6.5140E+04 | −3.0774E+05 | −1.4662E+03 | 9.5960E+02 |

| Surface number | S6 | S7 | S8 | S9 | S10 |
|---|---|---|---|---|---|
| K | −8.2954E+00 | −3.0172E+01 | −1.3399E+00 | −5.7211E+00 | −1.6808E+00 |
| A4 | −1.6759E−01 | 4.8474E−03 | 2.4358E−01 | −1.1260E−01 | −1.2541E+00 |
| A6 | −3.3280E−01 | 1.7627E−01 | −7.9806E−01 | −1.5632E+00 | 2.3725E+00 |
| A8 | 6.1703E+00 | −1.8605E+00 | 4.6610E−01 | 4.9647E+00 | −3.0873E+00 |
| A10 | −3.3971E+01 | 1.3970E+01 | 4.7011E+00 | −7.7393E+00 | 2.6953E+00 |
| A12 | 1.0467E+02 | −5.1121E+01 | −1.8191E+01 | 6.0947E+00 | −1.5844E+00 |
| A14 | −1.9585E+02 | 1.0577E+02 | 3.2642E+01 | −1.6586E+00 | 6.2079E−01 |
| A16 | 2.1974E+02 | −1.2669E+02 | −3.2701E+01 | −8.0352E−01 | −1.5586E−01 |
| A18 | −1.3533E+02 | 8.2089E+01 | 1.7750E+01 | 6.5611E−01 | 2.2699E−02 |
| A20 | 3.4937E+01 | −2.2324E+01 | −4.0670E+00 | −1.2504E−01 | −1.4565E−03 |

TABLE 20

| | Embodiment 7 | | |
|---|---|---|---|
| f (mm) | 1.683 | f1/sd1 | −3.705 |
| FNO | 2.0 | |CT4/R42| | 1.113 |
| FOV (degree) | 114 | CT2 (mm) | 0.811 |
| TTL (mm) | 4.12 | f12/f | 1.063 |
| ImgH (mm) | 2.29 | TTL/ImgH | 1.799 |
| sd1/ImgH | 0.35 | ET5/CT5 | 1.8 |
| n | 1.826 | f5/R52 | −4.665 |

Figure 14:
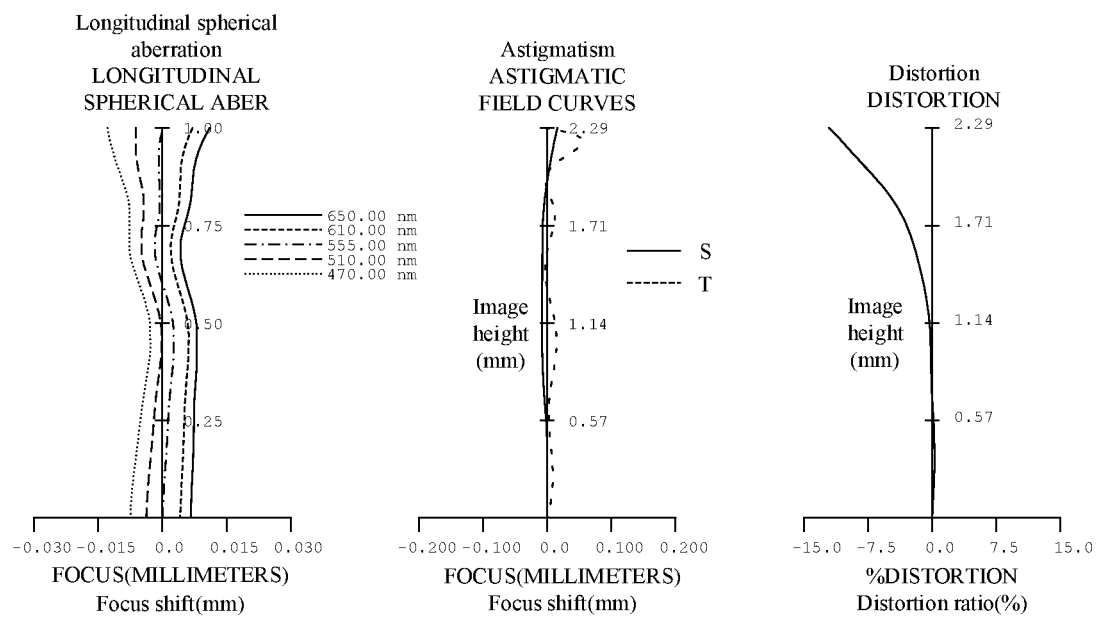
FIG. 14 shows a graph of longitudinal spherical aberration, a graph of astigmatism, and a graph of distortion of the wide-angle lens according to Embodiment 7 respectively.

FIG. 14 shows a graph of longitudinal spherical aberration, a graph of astigmatism, and a graph of distortion of the wide-angle lens 100 according to Embodiment 7 respectively, where a reference wavelength of the wide-angle lens 100 is 555 nm. The graph of longitudinal spherical aberration shows the deviation of the focus point of light rays with wavelengths of 470 nm, 510 nm, 555 nm, 610 nm, and 650 nm after passing through the wide-angle lens 100; the graph of astigmatism shows the curvature of meridian image surface and the curvature of sagittal image surface of light rays with a wavelength of 555 nm after passing through the wide-angle lens 100; the graph of distortion shows the distortion ratio of light rays with a wavelength of 555 nm after passing through the wide-angle lens 100 at different image heights. According to FIG. 14, it can be seen that the wide-angle lens 100 provided in Embodiment 7 can achieve good imaging quality.

Figure 15:
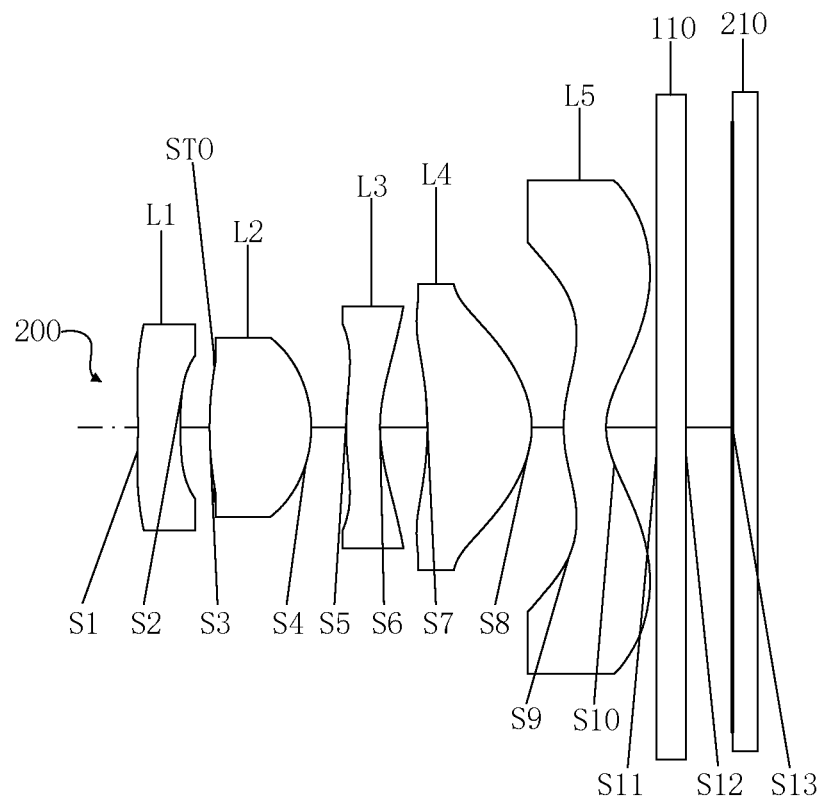
FIG. 15 shows a schematic diagram of an imaging device according to an embodiment of the present disclosure.

As shown in FIG. 15, the present disclosure further provides an image capturing device 200, which includes the wide-angle lens 100 as described above and a photosensitive element 210. The photosensitive element 210 is disposed on the image side of the wide-angle lens 100. A photosensitive surface of the photosensitive element 210 coincides with the image surface S13. Specifically, the photosensitive element 210 may adopt a complementary metal oxide semiconductor (CMOS) image sensor or a charge-coupled device (CCD) image sensor.

The above image capturing device 200 can use the above describe wide-angle lens 100 to capture images with small aberrations and higher resolution while having a relatively wide angle of view. At the same time, the imaging device 200 further has a characteristic of a small head, which is convenient for adapting to devices with limited size such as thin and light electronic equipment. Specifically, it can be served as a mobile phone camera, an in-vehicle camera, a surveillance camera, an endoscope, or the like.

Figure 16:
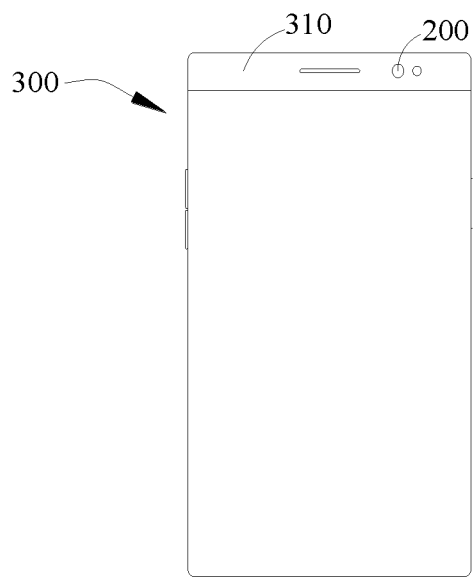
FIG. 16 shows a schematic diagram of an electronic device using an image capturing device according to an embodiment of the present disclosure.

As shown in FIG. 16, the present disclosure further provides an electronic device 300, which includes a housing 310 and the image capturing device 200 as described above, and the image capturing device 200 is installed on the housing 310. Specifically, the image capturing device 200 is disposed inside the housing 310 and exposed from the housing 310 to acquire images. The housing 310 can provide protections of dustproof, waterproof, and drop resistance for the image capturing device 200. A hole corresponding to the image capturing device 200 is defined on the housing 310 to allow light rays to penetrate into or out of the housing through the hole.

The above described electronic device 300 has a structure characteristic of light and thin. The image capturing device 200 described above can be used to capture images with a wide angle of view and good imaging quality, which can meet the shooting needs of cameras for mobile phones, vehicles, surveillance, medical equipment, or the like.

In some other embodiments, the "electronic device" used may further include, but is not limited to, a device configured to be connected via a wired line and/or to receive or send a communication signal via a wireless interface. An electronic device configured to communicate through a wireless interface may be referred to as a "wireless communication terminal", a "wireless terminal", or a "mobile terminal". Examples of the mobile terminal include, but are not limited to a satellite or cellular phone; a personal communication system (PCS) terminal that can combine a cellular radio phone with data processing, fax, and data communication capabilities; a personal digital assistant (PDA) that can include a radio phone, a pager, an Internet/Intranet access, a Web browser, a memo pad, and/or a global positioning system (GPS) receiver; and a conventional laptop and/or handheld receiver or other electronic device including a radio telephone transceiver.

The technical features of the above described embodiments can be combined arbitrarily. To simplify the description, not all possible combinations of the technical features in the above embodiments are described. However, all of the combinations of these technical features should be considered as within the scope of the present disclosure, as long as such combinations do not contradict with each other.

The above described embodiments merely represent several embodiments of the present disclosure, and the description thereof is more specific and detailed, but it should not be construed as limiting the scope of the present disclosure. It should be noted that for those of ordinary skill in the art, without departing from the concept of this disclosure, several modifications and improvements can be further made, which are all within the protection scope of the present disclosure. Therefore, the protection scope of the present disclosure shall be subject to the appended claims.

What is claimed is:

1. A wide-angle lens, comprising in sequence from an object side to an image side along an optical axis:
    a first lens with a negative focal power, an image side surface of the first lens being concave at the optical axis;
    a second lens with a positive focal power, an object side surface of the second lens being convex at the optical axis, and an image side surface of the second lens being convex at the optical axis;
    a third lens with a focal power;
    a fourth lens with a positive focal power, an image side surface of the fourth lens being convex at the optical axis;
    a fifth lens with a negative focal power, an object side surface of the fifth lens being convex at the optical axis, an image side surface of the fifth lens being concave at the optical axis, and at least one of the object side surface and the image side surface of the fifth lens comprising at least one inflection point; and,
    an optical stop disposed between the first lens and the second lens;
    wherein one of the first lens to the fifth lens is a glass lens, and the wide-angle lens satisfies the following relationship expression:

$sd1/ImgH<0.36$; and $109.7°≤FOV≤120°$;

wherein, sd1 represents a maximum effective half-aperture of an object side surface of the first lens, and ImgH is half of a diagonal length of an effective pixel area on an imaging surface of the wide-angle lens; and FOV represents a diagonal field of view of the wide-angle lens.

2. The wide-angle lens according to claim 1, wherein the wide-angle lens satisfies the following relationship expression:

$$n>1.7;$$

wherein, n represents a refractive index of the glass lens.

3. The wide-angle lens according to claim 1, wherein the wide-angle lens satisfies the following relationship expression:

$$-160<f1/sd1<-3;$$

wherein, f1 represents an effective focal length of the first lens.

4. The wide-angle lens according to claim 1, wherein the wide-angle lens satisfies the following relationship expression:

$$|CT4/R42|>0.37;$$

wherein, CT4 represents a thickness of the fourth lens on the optical axis, and R42 represents a radius of curvature of the image side surface of the fourth lens at the optical axis.

5. The wide-angle lens according to claim 1, wherein the wide-angle lens satisfies the following relationship expression:

$$CT2>0.55 \text{ mm};$$

wherein, CT2 represents a thickness of the second lens on the optical axis.

6. The wide-angle lens according to claim 1, wherein the wide-angle lens satisfies the following relationship expression:

$$0.69<f12/f<1.2;$$

wherein, f12 represents a combined focal length of the first lens and the second lens, and f represents an effective focal length of the wide-angle lens.

7. The wide-angle lens according to claim 1, wherein the wide-angle lens satisfies the following relationship expression:

$$TTL/\text{Img}H<1.85;$$

wherein, TTL represents a distance from an object side surface of the first lens to an imaging surface of the wide-angle lens on the optical axis.

8. The wide-angle lens according to claim 1, wherein the wide-angle lens satisfies the following relationship expression:

$$0.9<ET5/CT5<2.3;$$

wherein, CT5 represents a thickness of the fifth lens on the optical axis, and ET5 represents a thickness of the fifth lens at a maximum effective aperture of the fifth lens.

9. The wide-angle lens according to claim 1, wherein the wide-angle lens satisfies the following relationship expression:

$$-11.1<f5/R52<-2;$$

wherein, f5 represents an effective focal length of the fifth lens, and R52 represents a radius of curvature of the image side surface of the fifth lens at the optical axis.

10. An image capturing device, comprising a photosensitive element and the wide-angle lens according to claim 1, wherein the photosensitive element is disposed on an image side of the wide-angle lens.

11. An electronic device, comprising a housing and the image capturing device according to claim 10, wherein the image capturing device is installed on the housing.

12. A wide-angle lens, comprising in sequence from an object side to an image side along an optical axis:
a first lens with a negative focal power, an image side surface of the first lens being concave at the optical axis;
a second lens with a positive focal power, an object side surface of the second lens being convex at the optical axis, and an image side surface of the second lens being convex at the optical axis;
a third lens with a focal power;
a fourth lens with a positive focal power, an image side surface of the fourth lens being convex at the optical axis;
a fifth lens with a negative focal power, an object side surface of the fifth lens being convex at the optical axis, an image side surface of the fifth lens being concave at the optical axis, and at least one of the object side surface and the image side surface of the fifth lens comprising at least one inflection point; and,
an optical stop disposed between the first lens and the second lens;
wherein one of the first lens to the fifth lens is a glass lens, and the wide-angle lens satisfies the following relationship expression:

$$sd1/\text{Img}H<0.36;$$

$$105.2°≤FOV<120°; \text{ and}$$

$$1.55≤TTL/\text{Img}H<1.85;$$

wherein, sd1 represents a maximum effective half-aperture of an object side surface of the first lens, and ImgH is half of a diagonal length of an effective pixel area on an imaging surface of the wide-angle lens; FOV represents a diagonal field of view of the wide-angle lens; and TTL represents a distance from an object side surface of the first lens to an imaging surface of the wide-angle lens on the optical axis.

13. The wide-angle lens according to claim 12, wherein the wide-angle lens satisfies the following relationship expression:

$$n>1.7;$$

wherein, n represents a refractive index of the glass lens.

14. The wide-angle lens according to claim 12, wherein the wide-angle lens satisfies the following relationship expression:

$$-160<f1/sd1<-3;$$

wherein, f1 represents an effective focal length of the first lens.

15. The wide-angle lens according to claim 12, wherein the wide-angle lens satisfies the following relationship expression:

$$|CT4/R42|>0.37;$$

wherein, CT4 represents a thickness of the fourth lens on the optical axis, and R42 represents a radius of curvature of the image side surface of the fourth lens at the optical axis.

16. The wide-angle lens according to claim 12, wherein the wide-angle lens satisfies the following relationship expression:

$$CT2>0.55 \text{ mm};$$

wherein, CT2 represents a thickness of the second lens on the optical axis.

17. The wide-angle lens according to claim 12, wherein the wide-angle lens satisfies the following relationship expression:

0.69<f12/f<1.2;

wherein, f12 represents a combined focal length of the first lens and the second lens, and f represents an effective focal length of the wide-angle lens.

18. The wide-angle lens according to claim 12, wherein the wide-angle lens satisfies the following relationship expression:

0.9<ET5/CT5<2.3;

wherein, CT5 represents a thickness of the fifth lens on the optical axis, and ET5 represents a thickness of the fifth lens at a maximum effective aperture of the fifth lens.

19. The wide-angle lens according to claim 12, wherein the wide-angle lens satisfies the following relationship expression:

−11.1<f5/R52<−2;

wherein, f5 represents an effective focal length of the fifth lens, and R52 represents a radius of curvature of the image side surface of the fifth lens at the optical axis.

20. A wide-angle lens, comprising in sequence from an object side to an image side along an optical axis:
a first lens with a negative focal power, an image side surface of the first lens being concave at the optical axis;
a second lens with a positive focal power, an object side surface of the second lens being convex at the optical axis, and an image side surface of the second lens being convex at the optical axis;
a third lens with a focal power;
a fourth lens with a positive focal power, an image side surface of the fourth lens being convex at the optical axis;
a fifth lens with a negative focal power, an object side surface of the fifth lens being convex at the optical axis, an image side surface of the fifth lens being concave at the optical axis, and at least one of the object side surface and the image side surface of the fifth lens comprising at least one inflection point; and
an optical stop disposed between the first lens and the second lens;
wherein one of the first lens to the fifth lens is a glass lens, and the wide-angle lens satisfies the following relationship expression:

0.285≤sd1/ImgH<0.36;

109.7°≤FOV<120°; and 1.55≤TTL/ImgH<1.85;

wherein, sd1 represents a maximum effective half-aperture of an object side surface of the first lens, and ImgH is half of a diagonal length of an effective pixel area on an imaging surface of the wide-angle lens; FOV represents a diagonal field of view of the wide-angle lens; and TTL represents a distance from an object side surface of the first lens to an imaging surface of the wide-angle lens on the optical axis.

* * * * *